United States Patent
Harada et al.

(10) Patent No.: US 10,944,104 B2
(45) Date of Patent: Mar. 9, 2021

(54) ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Yasuhiro Harada, Isehara (JP); Norio Takami, Yokohama (JP); Takuya Iwasaki, Uenohara (JP); Kazuki Ise, Kawasaki (JP); Kazuomi Yoshima, Yokohama (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 132 days.

(21) Appl. No.: 16/119,493

(22) Filed: Aug. 31, 2018

(65) Prior Publication Data
US 2019/0296345 A1    Sep. 26, 2019

(30) Foreign Application Priority Data

Mar. 23, 2018 (JP) .............................. JP2018-056108

(51) Int. Cl.
*H01M 4/02* (2006.01)
*H01M 4/485* (2010.01)
(Continued)

(52) U.S. Cl.
CPC ............. *H01M 4/485* (2013.01); *B60L 58/10* (2019.02); *H01M 4/131* (2013.01);
(Continued)

(58) Field of Classification Search
CPC ....................................................... H01M 4/02
See application file for complete search history.

(56) References Cited

U.S. PATENT DOCUMENTS

2008/0078594 A1    4/2008   Harada et al.
2012/0308881 A1    12/2012  Tokuda et al.
(Continued)

FOREIGN PATENT DOCUMENTS

EP    2 448 054 A1    5/2012
EP    2 784 857 A1    10/2014
(Continued)

OTHER PUBLICATIONS

Gasperin, M. "Affinement de la structure de TiNb2O7 et repartition des cations", Journal of Solid State Chemistry 53, 1984, 4 pages.
(Continued)

*Primary Examiner* — Jacob B Marks
(74) *Attorney, Agent, or Firm* — Oblon, McClelland, Maier & Neustadt, L.L.P.

(57) ABSTRACT

According to one embodiment, an electrode is provided. The electrode includes an active material-containing layer which contains an active material. The active material includes a plurality of primary particles containing a niobium-titanium composite oxide. The average value ($FU_{ave}$) of the roughness shape coefficient (FU) according to Formula (1) below is 0.70 or more in 100 primary particles among the plurality of primary particles.

[Formula 1]

$$FU = \frac{f}{f_c} = \frac{4\pi a}{l^2} \quad (1)$$

13 Claims, 9 Drawing Sheets

(51) Int. Cl.
*B60L 58/10* (2019.01)
*H01M 10/0525* (2010.01)
*H01M 10/42* (2006.01)
*H01M 10/052* (2010.01)
*H01M 4/131* (2010.01)
*H01M 4/62* (2006.01)
*H01M 4/36* (2006.01)

(52) U.S. Cl.
CPC ..... *H01M 10/052* (2013.01); *H01M 10/0525* (2013.01); *H01M 10/425* (2013.01); *H01M 4/364* (2013.01); *H01M 4/625* (2013.01); *H01M 2004/027* (2013.01); *H01M 2010/4271* (2013.01)

(56) References Cited

U.S. PATENT DOCUMENTS

| | | | |
|---|---|---|---|
| 2015/0243979 A1 | 8/2015 | Nakahara et al. | |
| 2017/0125842 A1 | 5/2017 | Meguro et al. | |
| 2017/0271663 A1 | 9/2017 | Hoshina et al. | |
| 2017/0365857 A1* | 12/2017 | Isozaki | B60L 50/66 |
| 2018/0019504 A1* | 1/2018 | Kim | H01M 4/0471 |

FOREIGN PATENT DOCUMENTS

| | | |
|---|---|---|
| EP | 2 911 223 A1 | 8/2015 |
| EP | 3 141 527 A1 | 3/2017 |
| EP | 3 220 456 A1 | 9/2017 |
| JP | JP2017-168318 | 9/1917 |
| JP | JP2018-032569 | 3/1918 |
| JP | 2001-118568 * | 4/2001 |
| JP | 2006-261041 | 9/2006 |
| JP | 2008-91079 | 4/2008 |
| JP | 2010-287496 | 12/2010 |
| JP | 2015-187926 | 10/2015 |
| JP | 2016-35913 | 3/2016 |
| JP | 5925845 | 5/2016 |

OTHER PUBLICATIONS

Yoshimura, Y., et al. "Simple quantification method of particle shape of granular material like sand", Transactions of the Japan Society of Civil Engineers, No. 463 / III-22, 1993, 20 pages (with English Translation).

Abramoff, M., et al. "Image Processing with ImageJ", reprinted from the Jul. 2004 issue of Biophotonics International, 7 pages.

Nakai, I., et al. "Of the powdery X-rays analysis Actually—Introduction to lied belt method", Japan Society for Analytical Chemistry X-rays analysis study round-table conference, 2002, 59 pages (with English Translation).

Reich, C., et al. "Niobia Based Rutile Materials as SOFC Anodes", Fuel Cells, No. 3-4, 1, 2001, 7 pages.

* cited by examiner

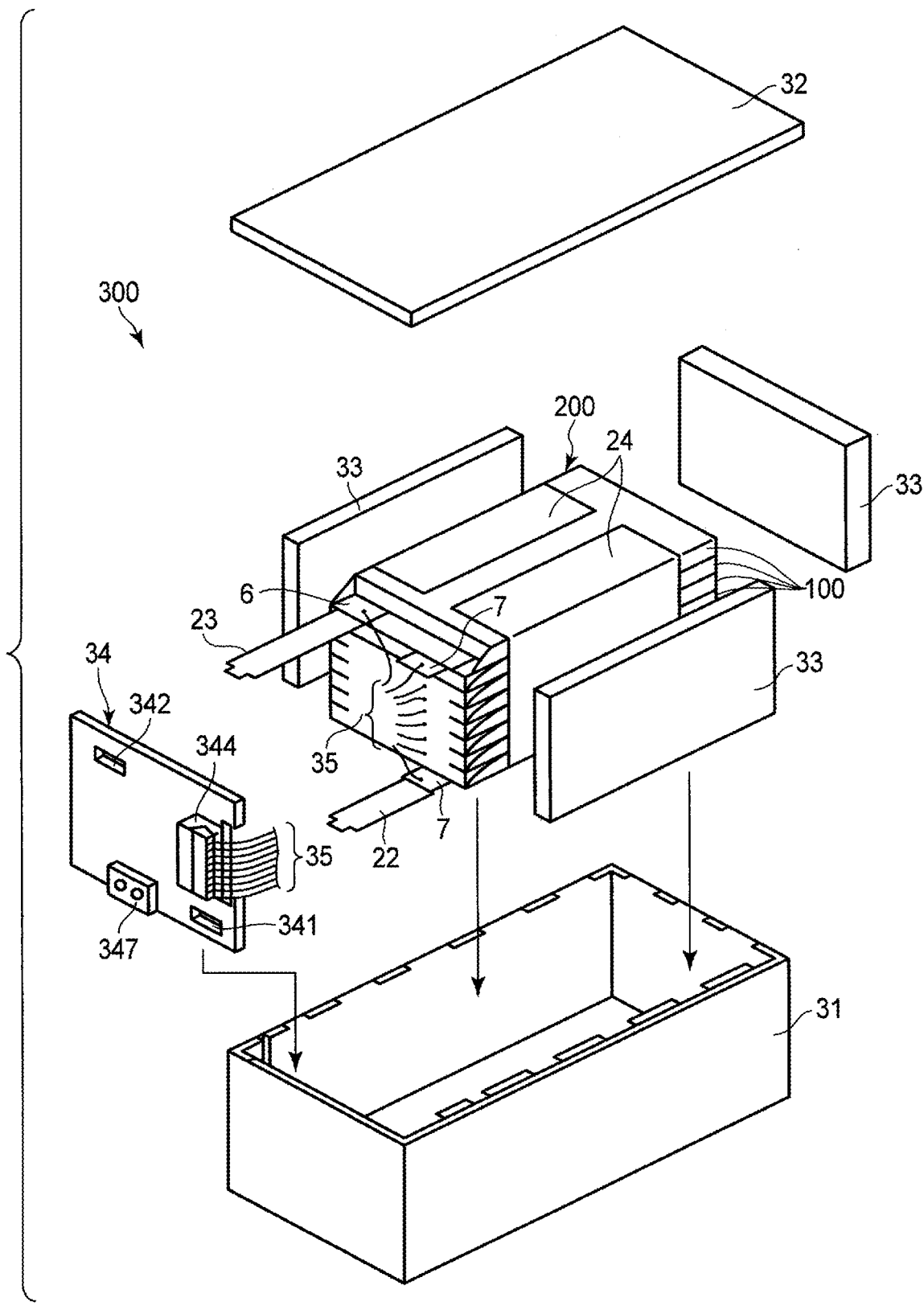
F I G. 10

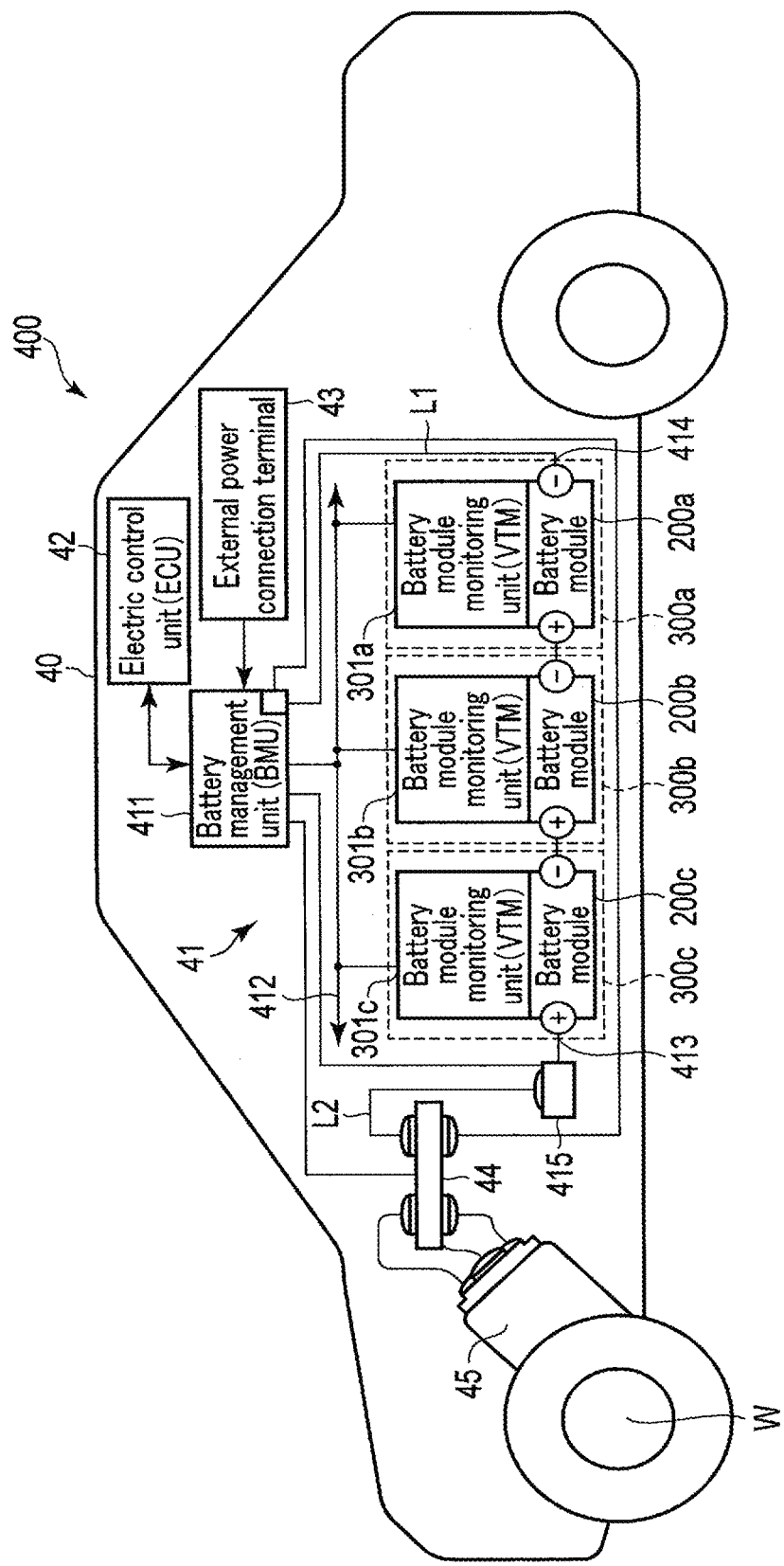
F I G. 13

ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2018-056108, filed Mar. 23, 2018, the entire contents of which are incorporated herein by reference.

FIELD

Embodiments described herein relate generally to an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$). Conventionally, it has therefore been difficult to drop the potential of the electrode in order to improve the energy density.

On the other hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above, a new electrode material containing Ti and Nb has been examined. Such a material containing a niobium-titanium composite oxide is expected to have a high charge/discharge capacity. Particularly, a composite oxide represented by TiNb$_2$O$_7$ has a high theoretical capacity exceeding 380 mAh/g. However, an electrode of TiNb$_2$O$_7$ has a low practical capacity of about 260 mAh/g, and there is a problem that the charge/discharge life is short.

BRIEF DESCRIPTION OF THE DRAWINGS

FIG. 10 is an exploded perspective view schematically showing an example of a battery pack according to the embodiment;

FIG. 13 is a diagram schematically showing another example of the vehicle according to the embodiment.

DETAILED DESCRIPTION

Figure 1:
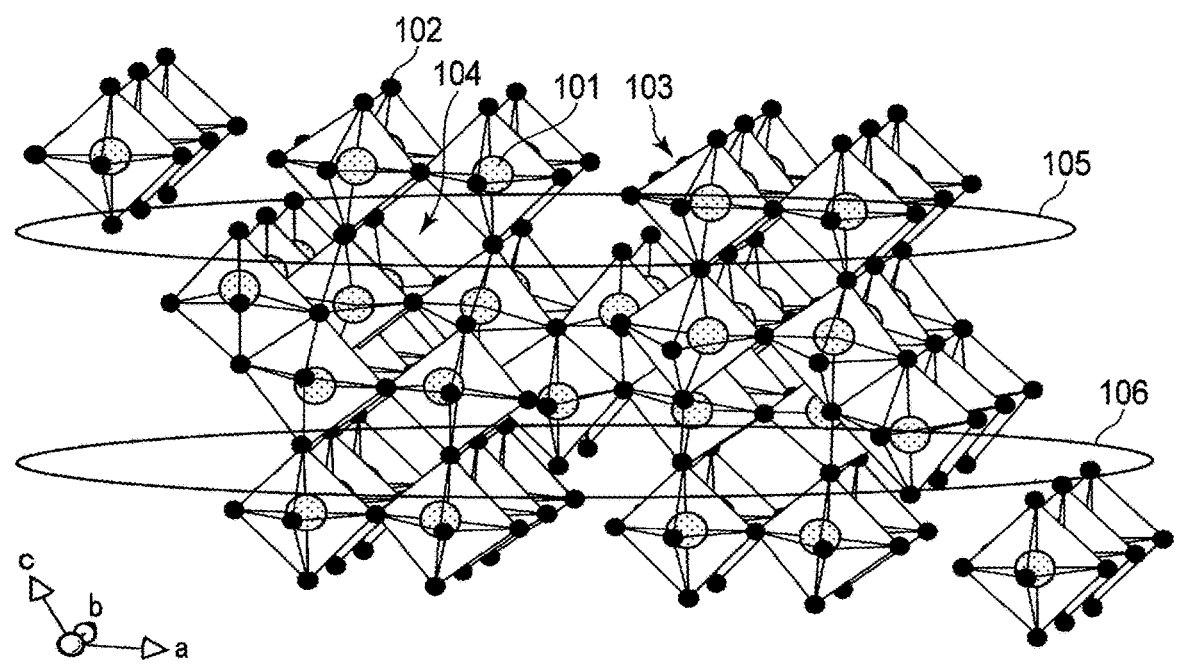
FIG. 1 is a schematic diagram showing a crystal structure of niobium-titanium composite oxide Nb$_2$TiO$_7$.

According to a first embodiment, an electrode is provided. The electrode includes an active material-containing layer which contains an active material. The active material includes a plurality of primary particles including a niobium-titanium composite oxide. The average value ($FU_{ave}$) of the roughness shape coefficient (FU) according to Formula (1) below is 0.70 or more in 100 primary particles among the plurality of primary particles. Each of the 100 primary particles has a particle size of 0.2 times to 4 times an average particle size (D50) determined from the particle size distribution chart of the plurality of primary particles obtained by the laser diffraction scattering method.

[Formula 1]

$$FU = \frac{f}{f_c} = \frac{4\pi a}{l^2} \quad (1)$$

In Formula (1), l represents an outer circumference length of a projected cross-section of each of the 100 primary particles, and a represents a cross-sectional area in the projected cross-section of each of the 100 primary particles.

According to a second embodiment, there is provided a secondary battery including a negative electrode, a positive electrode, and an electrolyte. As the negative electrode, the secondary battery includes the electrode according to the first embodiment.

According to a third embodiment, a battery pack is provided. The battery pack includes the secondary battery according to the second embodiment.

According to a fourth embodiment, a vehicle is provided. The vehicle includes the battery pack according to the third embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode is provided. The electrode includes an active material-containing layer which contains an active material. The active material includes a plurality of primary particles including a niobium-titanium composite oxide. The average value ($FU_{ave}$) of the roughness shape coefficient (FU) according to Formula (1) below is 0.70 or more in 100 primary particles among the plurality of primary particles. Each of the 100 primary particles has a particle size of 0.2 times to 4 times an average particle size (D50) determined from the particle size distribution chart of the plurality of primary particles obtained by the laser diffraction scattering method.

[Formula 2]

$$FU = \frac{f}{f_c} = \frac{4\pi a}{l^2} \quad (1)$$

In Formula (1), l represents an outer circumference length of a projected cross-section of each of the 100 primary particles, and a represents a cross-sectional area in the projected cross-section of each of the 100 primary particles.

The theoretical capacity of $Nb_2TiO_7$, which is a type of niobium-titanium composite oxide, is about 387 mAh/g. This value is twice or more relative to that of a titanium oxide having a spinel structure. However, in the reports so far, it has been confirmed that the actual capacity of the niobium-titanium composite oxide is lower than the theoretical capacity and is about 260 mAh/g.

As an attempt to increase the actual capacity, the volume energy density has been increased by reducing the particle size. However, the niobium-titanium composite oxide needs to be fired at a relatively high temperature, and thus primary particles become large. Therefore, it is necessary to perform a vigorous grinding treatment after firing in order to reduce the particle size. When the composite oxide is vigorously ground, the crystallinity of the primary particles is remarkably deteriorated. In addition, a side reaction of the fine powder generated by grinding with an electrolyte increases, and this causes a problem in that the life characteristics are significantly lowered.

Further, the particles ground by the vigorous grinding treatment have many roughnesses on the particle surface, and thus the particle surface is not smooth. An electrode containing a large amount of active material particles with many roughnesses on the surface has poor consolidation compactibility when the electrode is pressed. Even when the electrode is pressed with a high press pressure, the electrode density is unlikely to increase. As a result, the energy density of a battery is lowered.

Therefore, the present inventors focused attention on the shape of the primary particles of the niobium-titanium composite oxide. Specifically, from the particle size distribution chart of a plurality of active material particles included in the active material-containing layer, the average particle size (D50) of primary particles is first calculated. 100 primary particles are extracted from a plurality of primary particles having a particle size (diameter) of 0.2 times to 4 times the average particle size (D50). Next, for each of these particles, the roughness shape coefficient (FU) is calculated according to the following Formula (1). According to an electrode including an active material-containing layer which includes a plurality of primary particles in which the calculated average value ($FU_{ave}$) of the (FU) of 100 primary particles is 0.70 or more, it is possible to realize a secondary battery that can exhibit high energy density, excellent rapid charge/discharge performance, and long life characteristics. Note that a specific method of extracting 100 primary particles will be described later.

[Formula 3]

$$FU = \frac{f}{f_c} = \frac{4\pi a}{l^2} \quad (1)$$

In Formula (1), l represents an outer circumference length of a projected cross-section of each of the 100 primary particles, a represents a cross-sectional area in the projected cross-section of each of the 100 primary particles, and n represents a circular constant and is defined as 3.14.

The average value $FU_{ave}$ of the roughness shape coefficient (FU) is preferably in the range of 0.70 to 1.00, and more preferably in the range of 0.70 to 0.85.

A method of producing the niobium-titanium composite oxide according to the embodiment will be described in detail later. The primary particles, in which the average value ($FU_{ave}$) of the roughness shape coefficient (FU) is 0.70 or more, are not obtained by a vigorous grinding treatment, and thus the crystallinity of the primary particles is high. In addition, the primary particles include a large number of primary particles having smooth surfaces so that it is possible to greatly improve the compactibility of the electrode. When the compactibility of the electrode is high, the electrode density increases. Thus, the primary particles are likely to closely contact with each other. As a result, the electron transfer between the active material particles and the movement of lithium ions are facilitated. Thus, it is possible to achieve high energy density and excellent rapid charge/discharge performance.

Further, for example, when lithium ions are inserted into active material particles having smooth surfaces, thereby increasing the lattice constant, the surfaces of the active material particles can slide on contact surfaces with adjacent active material particles. Therefore, even if the particle size increases with the increase of the lattice constant, voids in the electrode or in the active material-containing layer can absorb an increase in volume. As a result, it is possible to suppress peeling of the binder or the like from the active material particles so that the electrode according to the embodiment is also excellent in life characteristics. In other words, the electrode according to the embodiment can suppress the expansion and shrinkage of the active material-containing layer or the electrode caused by charging and discharging.

Hereinafter, the electrode according to the embodiment will be described in detail.

The electrode includes an active material-containing layer which contains an active material. The electrode may further include a current collector. The active material-containing layer may be formed on both of reverse surfaces or one surface of the current collector. The active material-containing layer may optionally contain a conductive agent and a binder, in addition to the active material. The electrode is, for example, an electrode for a battery or an electrode for a secondary battery. The electrode may be a negative electrode including the niobium-titanium composite oxide described later as a negative electrode active material.

The active material includes a plurality of primary particles including a niobium-titanium composite oxide. Each of the primary particles may include the niobium-titanium composite oxide. The primary particles may include primary particles formed only of the niobium-titanium composite oxide. The active material may include primary particles which do not include the niobium-titanium composite oxide, but the content of the niobium-titanium composite oxide relative to the total amount of the active material is preferably in the range of 75% by weight to 100% by weight. The content of the niobium-titanium composite oxide relative to the total amount of the active material is preferably as close to 100% by weight as possible. The active material may include a plurality of secondary particles including a niobium-titanium composite oxide.

Regarding the niobium-titanium composite oxide included in the active material according to the embodiment, its representative composition is, for example, $Nb_2TiO_7$. The niobium-titanium composite oxide preferably has, though is not limited to, a crystal structure having a symmetry of the space group C2/m and an atomic coordinate described in Journal of Solid-State Chemistry 53, pp. 144-147 (1984).

The niobium-titanium composite oxide mainly has a monoclinic crystal structure. As an example, schematic diagrams of the crystal structure of monoclinic $Nb_2TiO_7$ are shown in FIGS. 1 and 2.

Figure 2:
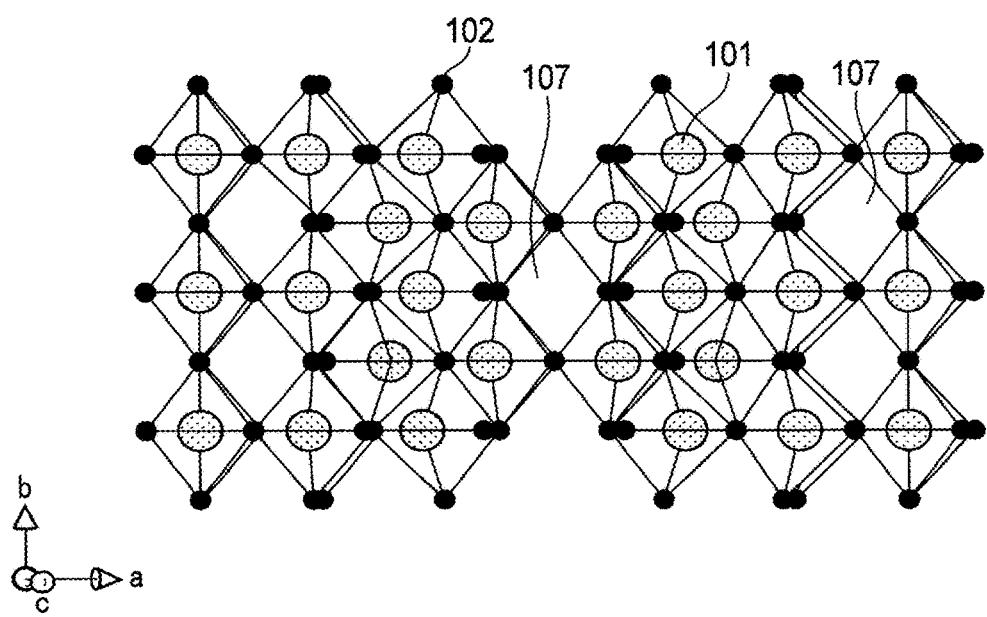
FIG. 2 is a schematic view showing the crystal structure of FIG. 1 from another direction.

As shown in FIG. 1, in the crystal structure of monoclinic $Nb_2TiO_7$, a metal ions 101 and an oxide ions 102 form skeleton structure portions 103. At the position of the metal ions 101, Nb ions and Ti ions are arranged at random in the following ratio; Nb:Ti=2:1. The skeleton structure portions 103 arranged alternately and three-dimensionally, thereby vacancies 104 are formed among the skeleton structure portions 103. These vacancies 104 serve as hosts for lithium ions. From 0 mol to a maximum of 5.0 mol of lithium ions can be inserted into this crystal structure. When 5.0 mol of lithium ions are inserted, the composition can be represented as $Li_5Nb_2TiO_7$.

In FIG. 1, regions 105 and regions 106 are sections having two-dimensional channels in [100] direction and [010] direction. As shown in FIG. 2, the crystal structure of monoclinic $Nb_2TiO_7$ has vacancies 107 along a [001] direction. The vacancies 107 has a tunnel structure advantageous in conduction of lithium ions, and serve as a conductive path in the [001] direction, connecting between the region 105 and the region 106. This electrically conductive path makes it possible for the lithium ions to migrate between regions 105 and regions 106.

Furthermore, in the crystal structure, when a lithium ion is inserted into vacancies 104, a metal ions 101, which structures the skeleton, is reduced to a valence of three, thereby maintaining electric neutrality of a crystal. In the niobium-titanium composite oxide, not only Ti ions are reduced from tetravalent to trivalent, but also Nb ions are reduced from pentavalent to trivalent. Therefore, the number of reduced valences per active material weight is large. Therefore, the niobium-titanium composite oxide can maintain electric neutrality of the crystal even if many lithium ions are inserted. Thus, energy density is higher in the niobium-titanium composite oxide as compared to that in a compound such as titanium oxide only containing a tetravalent cation. Further, the niobium-titanium composite oxide has a lithium insertion potential of about 1.5 V (vs. Li/Li$^+$). Therefore, an electrode including the niobium-titanium composite oxide as the active material can realize a battery capable of stably and repeatedly performing rapid charge-and-discharge.

The niobium-titanium composite oxide includes, for example, at least one selected from the group consisting of $Nb_2TiO_7$, $Nb_2Ti_2O_9$, $Nb_{10}Ti_2O_{29}$, $Nb_{14}TiO_{37}$, and $Nb_{24}TiO_{62}$. The niobium-titanium composite oxide may be a substituted niobium-titanium composite oxide in which at least a part of Nb and/or Ti is substituted by a dopant. Examples of substitution elements are Na, K, Ca, Co, Ni, Si, P, V, Cr, Mo, Ta, Zr, Mn, Fe, Mg, B, Pb, and Al. The substituted niobium-titanium composite oxide may include one kind or two or more kinds of the substitution elements. The active material particles may include one kind or plural kinds of niobium-titanium composite oxides. It is preferable that the niobium-titanium composite oxide includes a monoclinic niobium-titanium composite oxide $Nb_2TiO_7$. In this case, as described above, an electrode having excellent capacity and rate characteristics can be obtained.

Examples of the monoclinic niobium-titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, Bi, K, Ca, B, Co, Fe, Mn, Ni, Si, P, and Mo. The respective subscripts in the composition formula are specified as follows: $0 \leq x \leq 5$, $0 \leq y < 1$, $0 \leq z < 2$, and $-0.3 \leq \delta \leq 0.3$.

Another example of the monoclinic niobium-titanium composite oxide is a compound represented by $Ti_{1-y}M3_{y+z}Nb_{2-z}O_{7-\delta}$. Here, M3 is at least one selected from Mg, Fe, Ni, Co, W, Ta, and Mo. The respective subscripts in the composition formula are specified as follows: $0 \leq y < 1$, $0 \leq z < 2$, and $-0.3 \leq \delta \leq 0.3$.

The active material may include other active materials except the niobium-titanium composite oxide. Examples of other active materials include lithium titanate having a ramsdellite structure (e.g., $Li_{2+y}Ti_3O_7$, $0 \leq y \leq 3$), lithium titanate having a spinel structure (e.g., $Li_{4+x}Ti_5O_{12}$, $0 \leq x \leq 3$), monoclinic titanium dioxide ($TiO_2(B)$), anatase-type titanium dioxide, rutile-type titanium dioxide, a hollandite-type titanium composite oxide, and an orthorhombic titanium-containing composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

In the case where the active material further includes a monoclinic titanium dioxide, the electronic conductivity is improved as Li ions are inserted. Accordingly, the charge/discharge rate performance tends to be improved. Further, in this case, the electrode density tends to be increased by reducing a conductive agent in the electrode.

The average particle size (D50) of the primary particles including the niobium-titanium composite oxide contained in the active material is preferably in the range of 0.5 μm to 5 μm, more preferably in the range of 0.50 μm to 5 μm, and still more preferably in the range of 0.5 μm to 2 μm. When the average particle size (D50) of the primary particles is less than 0.5 μm, the specific surface area is high and the number of voids in the electrode increases. Thus, this makes it difficult to increase the electrode density. As a result, the contact properties between the active material particles in the electrode and the contact properties between the active material particles and the conductive agent are deteriorated, and the life performance tends to deteriorate. Further, the high specific surface area increases the reactivity with the electrolyte, and the resistance increases due to formation of the film on the electrode surface, whereby the rapid charge/discharge performance tends to decrease. On the other hand, when the average particle size (D50) of the primary particles is larger than 50 μm, the Li-ion diffusion distance in the solid becomes long and the rapid charge/discharge performance tends to decrease. A method of determining the average particle size (D50) of the primary particles contained as active materials will be described later.

The BET specific surface area of the niobium-titanium composite oxide included in the active material is preferably 0.1 m²/g or more and less than 100 m²/g, though no particular limitation is imposed. When the specific surface area is 0.1 m²/g or more, a contact area with an electrolytic solution can be secured, good discharge rate characteristics can be easily obtained, and the charging time can be shortened. When the BET specific surface area is less than 100 m²/g, reactivity with the electrolytic solution does not become too high, and therefore, the life characteristics can be improved. Further, when the BET specific surface area is less than 100 m²/g, applicability becomes good for a slurry including the active material, which is used in the later-described production of an electrode.

The crystallite size of the active material is, for example, in the range of 50 nm to 200 nm, preferably in the range of 80 nm to 120 nm. When the crystallite size is within this range, Li ion conduction in the crystal proceeds smoothly. Thus, it is possible to improve the charge/discharge efficiency and rate performance.

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

There may be used for the current collector, a material which is electrochemically stable at the potential at which lithium (Li) is inserted into and extracted from active material. For example, in the case where the electrode is used as a negative electrode, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably in the range of 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

The density of the active material-containing layer (excluding the current collector) is preferably in the range of 2.4 g/cm³ to 3.0 g/cm³. The density of the active material-containing layer can also be referred to as "electrode density". When the electrode density is within this range, the active material particles adequately contact with the conductive agent, whereby the balance between the formation of an electron conductive path in the electrode and the permeability of the electrolytic solution becomes good, and the rapid charge/discharge performance and the life performance are improved.

The active material-containing layer according to the embodiment includes a large number of primary particles having smooth surfaces as described above. Therefore, the consolidation compactibility of the electrode is high. Therefore, for example, in the case where the electrode in which the average value $FU_{ave}$ of the roughness shape coefficient (FU) is 0.70 or more and the electrode in which the average value $FU_{ave}$ is less than 0.70 are pressed by the same press pressure, the electrode densities of the produced electrodes are different from each other. The electrode density tends to be higher in the electrode in which the average value $FU_{ave}$ of the roughness shape coefficient (FU) is 0.70 or more, whereby the primary particles are likely to closely contact with each other. When the electrode density is high, not only high energy density and rapid charge/discharge performance can be enhanced but also degradation of the active material particles due to charging and discharging proceeds relatively uniformly, thereby improving the life characteristics. However, when the electrode density is excessively high, there is a disadvantage that the electrolytic solution is unlikely to permeate, the volume change of the active material due to charging and discharging cannot be absorbed, and the life performance is decreased.

<Production Method>

The active material included in the electrode according to the embodiment may be produced by the following method.

First, starting materials are mixed. As the starting material for the niobium-titanium composite oxide, an oxide or a salt including Li, Ti, and Nb is used. The salt used as the starting material is preferably a salt that decompose at relatively low temperature to form an oxide, such as a carbonate and nitrate. The particle size of these starting materials is preferably in the range of 0.1 μm to 10 μm, and more preferably in the range of 0.1 μm to 5 μm. This is because when the particle size is less than 0.1 μm, the starting materials tend to fly in the atmosphere during mixing, and the deviation of composition is likely to occur, whereas when the particle size is larger than 10 μm, unreacted products are formed.

The starting materials are mixed at a molar ratio such that the Nb source and the Ti source do not have the desired composition. For example, when the ratio of Nb and Ti in the desired composition is not 1:1, the starting materials are mixed at a molar ratio of 1:1 so that the Nb source and the Ti source as raw materials are equimolar. The mixed raw materials are subjected to a preliminary firing at a temperature within the range of 500° C. to 1000° C. for about 2 hours to 5 hours. Then, the starting materials are additionally mixed with the preliminary-fired powder in such an amount as to obtain the desired composition. The starting materials are added so that the ratio of elements of the whole starting materials used coincides with the desired composition. Further, the mixture after the addition of the raw materials is subjected to main firing. The main firing is performed in two or more stages, at a temperature of 1000° C. to 1450° C. for a total of 10 hours to 40 hours. After the main firing, it is preferable to further perform an annealing treatment at a temperature equal to or lower than the temperature at the time of the main firing. The annealing treatment is performed by heat treatment at a temperature of 350° C. to 800° C. for 1 hour to 5 hours. The oxygen deficiency of the niobium-titanium composite oxide can be repaired by performing the annealing treatment so that high capacity and excellent life performance can be achieved.

The fired powder is promptly taken out from an electric furnace and cooled to room temperature. This cooling is preferably performed under the condition that the temperature of the fired product reaches 100° C. or less within 1 hour from the temperature at the time of firing.

In this way, rather than mixing the starting materials at the desired composition ratio from the beginning and firing the mixture, the composition ratio of the raw materials mixed at the time of preliminary firing differs from the composition ratio of the raw materials mixed at the time of main firing and firing is performed in two or more stages, whereby it is possible to suppress the growth of primary particles. This is because when the firing is performed from the beginning at the mixing ratio of the desired composition, which is suitable for the desired crystal phase formation, growth of the particles immediately proceed after the necking of the particles during the firing reaction, however, the mixing ratio different from the desired composition causes an excess or shortage of the raw materials and thus the particles of the raw materials remain between the reactant particles, thereby suppressing the growth of the particles.

The surfaces of the active material particles in which the growth of the primary particles is suppressed is smooth. That is, according to such a production method, the active material according to the embodiment can be produced.

Into the niobium-titanium composite oxide synthesized by the above-described method, lithium ions may be inserted by charging a battery. Alternatively, as described above, the niobium-titanium composite oxide may be synthesized as a composited oxide including lithium, by using a compound containing lithium such as lithium carbonate as a starting material.

An electrode is produced, for example, by the following method using the active material particles produced as described above. First, an active material, a conductive agent, and a binder are suspended in a solvent to prepare a slurry. The slurry is applied onto one surface or both of reverse surfaces of a current collector. Next, the applied slurry is dried to form a laminate of active material-containing layer and current collector. Then, the laminate is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets on the current collector.

<Determination of Average Value $FU_{ave}$ of Roughness Shape Coefficient (FU)>

A method of determining the average value $FU_{ave}$ of the roughness shape coefficient (FU) for a plurality of primary particles including a niobium-titanium composite oxide will be described.

When the active material particles contained in the battery are to be measured, the active material is taken out from the battery by the following procedure.

First, the battery is completely discharged. The battery is discharged at a 0.1 C current up to a rated final voltage in an environment of 25° C. so that the battery can be put into the state-of-discharge.

Next, the battery is disassembled in a glove box filled with argon and the electrode body (or the electrode group) is taken out. The electrode body is washed with an appropriate solvent and dried under reduced pressure at 60° C. for 12 hours. As the washing solvent, for example, ethyl methyl carbonate or the like can be used. Thus, the organic electrolyte contained in the electrode body can be removed. Then, the electrode is cut into two electrode pieces. One of the cut electrode pieces is immersed in a solvent (preferably an organic solvent such as alcohol or NMP), and ultrasonic waves are applied. Thereby, the current collector and the electrode constituent material contained in the electrode body can be separated. Next, a dispersion solvent in which the electrode constituent material is dispersed is placed in a centrifuge, and only the active material particles are separated from the powder in the electrode body containing a conductive agent such as carbon.

Subsequently, a method of measuring the particle size distribution of the active material particles prepared as described above will be described.

The active material powder is subjected to particle size distribution measurement by the laser diffraction scattering method so that the average particle size (D50) of the primary particles can be determined from the cumulative frequency curve of the active material particles. As a laser diffractometer, for example, MT 3000 II (manufactured by MicrotracBell Corp.) can be used.

However, when the active material particles to be measured mainly contain secondary particles, it is difficult to measure the average particle size (D50) of the primary particles using the laser diffractometer. Therefore, in this case, it is necessary to estimate the average particle size (D50) of the primary particles by observing a scanning electron microscope (SEM) image. Whether the active material particles to be measured mainly include secondary particles or not is judged by observation with SEM. The active material powder is affixed to a stage for SEM with a carbon tape and the observation is performed at a magnification that the boundary line of the outer circumference (contour) of the primary particle is clearly visible, for example, at 5000 to 20000 magnifications. Regarding 100 arbitrary particles in this SEM image, the respective particle sizes are determined by the following procedure. Among circles (i.e., circumscribed circles) enveloping the target particles, a circle having the smallest diameter (referred to as "minimum circumscribed circle") is drawn, and the diameter of this circle is defined as the particle size. An average value of particle sizes determined for the arbitrary 100 particles is used as a substitute value for the average particle size (D50) of primary particles.

Figure 3:
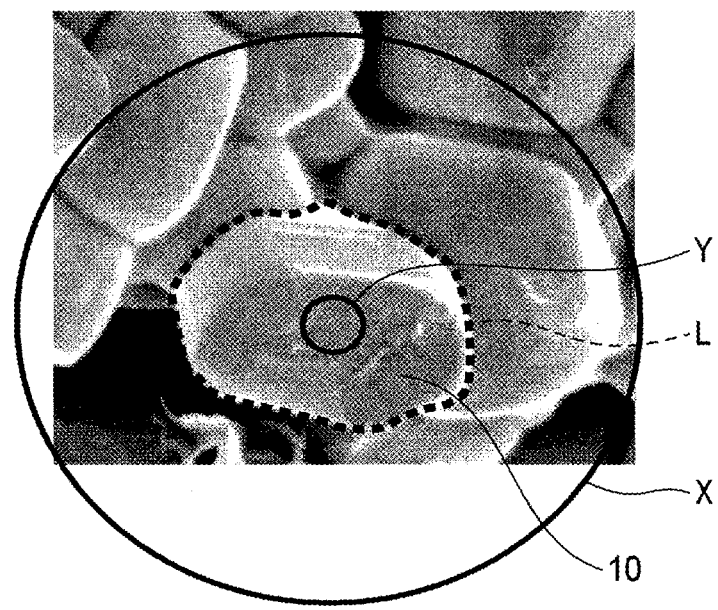
FIG. 3 is a view showing an example of a scanning electron microscope (SEM) image of an active material according to an embodiment.
Figure 4:
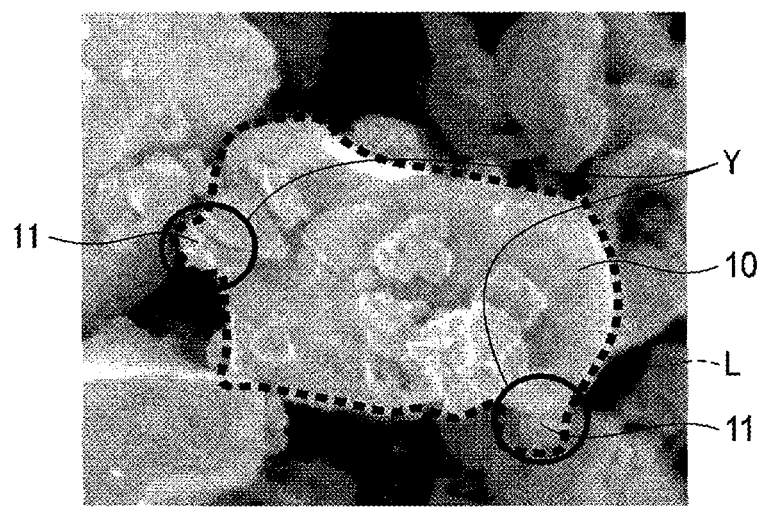
FIG. 4 is a view showing another example of the SEM image of the active material according to the embodiment.

Next, the roughness shape coefficient (FU) is determined for each of the primary particles. This procedure will be described with reference to FIGS. 3 and 4. FIG. 3 is a view showing an example of the SEM image (×20000 magnification) of the active material according to the embodiment. FIG. 4 is a view showing another example of the SEM image (×20000 magnification) of the active material according to the embodiment. Regarding the specific definition of the roughness shape coefficient (FU), the content of Non-Patent Document "Yuji Yoshimura and Shoji Ogawa (1993), SIMPLE QUANTIFICATION METHOD FOR GRAIN SHAPE OF GRANULAR MATERIALS SUCH AS SAND, Journal of the Japan Society of Civil Engineers, No. 463/III-22, pp. 95-103" is cited by reference.

The other one of the electrode pieces prepared previously is affixed to a stage for SEM with a carbon tape. At this time, the electrode piece is affixed so that the active material-containing layer can be observed from the perpendicular direction of the active material-containing layer. A total of 100 points in the central part in the short-side direction of the electrode is observed at equal intervals from the end of the electrode in the longitudinal direction. At each observation point, one primary particle that satisfies the following conditions is selected from the particles in which the boundary line of the outer circumference (contour) of the primary particle can be visually recognized clearly. Thus, a total of 100 primary particles is used as particles to be measured. The observation magnification is the magnification of the particle in which the boundary line of the outer circumference (contour) of the primary particle can be visually recognized clearly and is, for example, in the range of 5000 to 20000 magnifications.

First, the center of gravity is determined from the projected area of the primary particle. Here, a circle having a radius of the value of the D50 determined previously is defined as a circle X. A circle having a radius of a value obtained by multiplying the value of the D50 by 0.1 times is defined as a circle Y. As shown in FIG. 3, when the centers of the circle X and the circle Y are superimposed on the center of gravity of a primary particle 10 to be measured, a primary particle in which an outer circumference L of the primary particle 10 is larger than the circle Y and smaller than the circle X is determined at each observation point.

Regarding the image of these 100 primary particles, a length l of the outer circumference L of the target particle 10 and a cross-sectional area a of the target particle 10 are determined using an image analysis tool. For example, ImageJ shown in Non-Patent Document "Dr. Michael et al., Image Processing with ImageJ, Reprinted from the July 2004 issue of Biophotonics International copyrighted by Laurin Publishing Co. INC." can be used as the image analysis tool. From the obtained outer circumference length l and the cross-sectional area a, the roughness shape coefficient (FU) is calculated for each of the 100 primary particles selected according to the following Formula (1). Further, the average value $FU_{ave}$ of the calculated roughness shape coefficient (FU) of the 100 particles is calculated.

[Formula 4]

$$FU = \frac{f}{f_c} = \frac{4\pi a}{l^2} \quad (1)$$

In measuring the outer circumference length l of the target particle 10 and the cross-sectional area a of the target particle 10, when fine particles 11 having a particle size smaller than the circle Y are attached to the surface and/or outer circumference of the primary particle 10 to be measured, the outer circumference including the fine particles 11 is defined as the outer circumference L of the primary particle 10 and measured. Further, the cross-sectional area a of the fine particle 11 is also measured, in addition to the cross-sectional area a of the target particle 10. The SEM image shown in FIG. 4 shows an example when the fine particles 11 having a smaller particle size than the circle Y are attached to the surface and/or outer circumference of the primary particle 10 to be measured. FIG. 4 shows that the particle size of the fine particles 11 is smaller than the circle Y. The reason for considering the outer circumference length and the cross-sectional area of the fine particle 11, in addition to the outer circumference length and the cross-sectional area of the primary particle 10 to be measured, is as follows. It is necessary to reflect the fact that the smoothness of the particle surface is lost because the fine particles 11 are attached to the surface of the primary particle 10 on the value of the roughness shape coefficient (FU).

<Confirmation of Crystal Structure of Active Material>

The crystal structure of the active material can be confirmed by combining X-ray diffraction (XRD) measurement with the Rietveld method, for example.

The powder X-ray diffraction measurement of the active material can be performed, for example, as follows.

If necessary, the active material is first ground to prepare a sample having an average particle size of less than about 5 μm. The average particle size can be obtained by laser diffraction. The obtained sample is filled in a holder part having a depth of 0.2 mm, formed on a glass sample plate. Next, another glass plate is pressed from the outside to flatten the surface of the filled sample. Care should be taken to fill the filled sample with a sufficient amount of sample so as not to cause cracks, voids, irregularities or the like. Further, it is necessary to take care for pressing the glass plate with sufficient pressure. Next, the glass plate filled with the sample is placed in a powder X-ray diffraction apparatus, and an XRD pattern is obtained using Cu-Kα ray.

In the case where there is a high degree of orientation in the sample, there is the possibility of deviation of peak position and variation in an intensity ratio, depending on how the sample is filled. The sample having such a remarkably high degree of orientation is measured using a capillary. Specifically, a sample is inserted into a capillary, and this capillary is mounted on a rotary sample stage and measured. This measurement method is applied so that the orientation can be relaxed. As the capillary, a Lindeman glass capillary is used.

The active material contained in the battery as an electrode material can be measured as follows. First, the lithium ions are completely released from the active material (e.g., niobium-titanium composite oxide) in the electrode material. For example, when this active material is used for the negative electrode, the battery is made completely in a state-of-discharge. As a result, the crystalline state of the active material can be observed. The remaining lithium ions may exist even in the state-of-discharge. Impurity phases such as lithium carbonate and lithium fluoride may be mixed in the powder X-ray diffraction measurement result due to the influence of lithium ions remaining in the electrode. The mixing of the impurity phases can be prevented, for example, by setting a measurement atmosphere to an inert gas atmosphere or cleaning the surface of the electrode. Even if there are impurity phases, it is possible to ignore these phases and perform analysis.

Next, the battery is disassembled in a glove box filled with argon, and the electrode is taken out. The taken-out electrode is washed with an appropriate solvent. For example, ethyl methyl carbonate may be used for washing. The cleaned electrode is cut into an area approximately the same as the area of the holder of the powder X-ray diffraction apparatus to obtain a measurement sample.

The cut sample (electrode) is affixed directly to the glass holder for measurement. In this case, the positions of the peaks originating from the electrode substrate such as a metal foil are measured in advance. The peaks of other components such as a conductive agent and a binder are also measured in advance. When the peaks of the substrate and active material overlap with each other, it is desirable that the layer including the active material (e.g., the active material-containing layer to be described later) is separated from the substrate, and subjected to measurement. This is in order to separate the overlapping peaks when quantitatively measuring the peak intensity. For example, the active material layer can be separated by irradiating the electrode substrate with an ultrasonic wave in a solvent. The active material layer is enclosed in a capillary, and the capillary is placed on a rotary sample stage and measured. According to the method, it is possible to obtain an XRD pattern of the active material in addition to reducing the influence of the orientation. The XRD pattern obtained at this time must be applicable to Rietveld analysis. In order to collect data for Rietveld analysis, the measurement time and/or X-ray intensity is appropriately adjusted in such a manner that the step width is made ⅓ to ⅕ of the minimum half width of the diffraction peaks, and the intensity at the peak position of strongest reflected intensity is 5000 counts to 10000 counts.

The obtained XRD pattern is analyzed by the Rietveld method. In the Rietveld method, the diffraction pattern is calculated from the crystal structure model which has been previously estimated. The parameters of the crystal structure (lattice constant, atomic coordinate, occupancy rate, or the like) can be precisely analyzed by fitting all the calculated values with the measured values. Thereby, the characteristics of the crystal structure of the synthesized oxide can be determined. Further, the occupancy ratio of constitutional elements in each of the sites can be determined.

A fitting parameter S is used as a scale for estimating the degree of matching between observed intensities and calculated intensities in the Rietveld analysis. The analysis is performed such that S value is smaller than 1.8. When determining the occupancies in each of the sites, the standard deviation $\sigma_j$ must be taken into consideration. The fitting parameter S and standard deviation $\sigma_j$ defined herein are estimated using the mathematical formula described in Non-Patent Document "Izumi Nakai and Fujio Izumi, ACTUAL POWDER X-RAY ANALYSIS", X-ray Analysis Research Meeting of Japan Society for Analytical Chemistry (Asakura Shoten), published on Jul. 10, 2009" (pages 97 to 115). In this method, for the monoclinic niobium-titanium composite oxide having a space group C2/m symmetry of the embodiment, in each of the 2a or 4i metal cation occupancy sites in the crystal structure, a case is tested where fitting is performed assuming that each cation equally occupies the sites, meanwhile, a case is tested where fitting is performed with individual occupancy rates set for each element, assuming that distribution of ions of each element is biased. As a result, the one having a smaller convergence value of a fitting parameter S, that is, the one with better fitting can be determined to be closer to the actual occupation state. Thus, it can be determined whether the cations are randomly arranged, or not.

<Method of Confirming Composition of Active Material>

The composition of the active material can be analyzed using Inductively Coupled Plasma (ICP) emission spectrometry, for example. In this case, the abundance ratios (molar ratio) of elements depend on the sensitivity of the analyzing device used. Therefore, the molar ratio to be measured may deviate from the actual molar ratio by the error of the measuring device. However, even if the numerical value is deviated within an error range of the analyzing device, the performance of the electrode according to the embodiment can be sufficiently exerted.

In order to measure the composition of the active material assembled into a battery according to ICP emission spectrometry, the following procedure is specifically performed.

First, according to the procedure previously described in the section of powder X ray diffraction, an electrode including the active material to be measured is taken out from a secondary battery, and washed. From the washed electrode, the portion including an electrode active material, such as the active material-containing layer, is removed. For example, the portion including the electrode active material can be removed by irradiating with an ultrasonic wave. As a specific example, an electrode is put into ethyl methyl carbonate in a glass beaker, the glass beaker is vibrated in an ultrasonic washing machine, and thereby an active material-containing layer including the electrode active material can be separated from an electrode current collector, for example.

Next, the removed portion is heated for a short time (e.g., about 1 hour at 500° C.) in air to thereby sinter away unnecessary components such as binder components and carbon. By dissolving the residue in an acid, a liquid sample including the active material can be prepared. Here, hydrochloric acid, nitric acid, sulfuric acid, hydrogen fluoride, and the like may be used as the acid. The components in the active material can be found by subjecting the liquid sample to ICP analysis.

<Method of Measuring Specific Surface Area of Active Material Particles>

The specific surface area of the active material particles can be measured using a method where molecules, in which an occupied area in adsorption is known, are adsorbed onto the surface of powder particles at the temperature of liquid nitrogen, and the specific surface area of the sample is determined from the amount of adsorbed molecules. The most commonly used is the BET method based on low-temperature and low-humidity physical adsorption of inert gas, which is the most well-known theory of the method of calculating the specific surface area in which the Langmuir theory, which is a monolayer adsorption theory, is extended to multilayer adsorption. The specific surface area determined by the above method is referred to as "BET specific surface area".

<Confirmation of Presence or Absence of Carbon Material on Particle Surface>

Whether or not the carbon material is provided on the particle surface of the niobium-titanium composite oxide may be examined as follows.

First, according to the procedure previously described in the section of powder X ray diffraction, an electrode including the active material to be measured is taken out from a secondary battery, and washed.

An active material powder is taken out from the washed electrode. The active material powder may be taken out as follows, for example. First, an electrode containing a binder is dispersed in a solvent. As the solvent to be used in this case, for example, N-methylpyrrolidone is used if the binder is an organic solvent binder, and pure water is used if the binder is an aqueous binder (for example, a water-soluble binder). The solvent is irradiated with ultrasonic waves for 30 minutes or more to disperse the electrode. As a result, the binder becomes dissolved, and an electrode material may be separated as a powder from a current collector. Then, a solvent containing the powder of the electrode material is placed in a centrifuge, separated into a conductive agent and active material particles, and then recovered by freeze drying. Thus, the active material powder may be taken out while maintaining the carbon material provided on the particle surface.

The taken out active material is washed with an organic solvent such as a diethyl carbonate solvent to dissolve and remove a lithium salt and then dried. After drying, the active material, which has been thoroughly washed with water in air to remove residual lithium ions, is used as a measurement subject.

The carbon material on the particle surface may be analyzed by the following inorganic element analysis. An active material sample prepared as a measurement target is placed in an alumina crucible together with a combustion improver and burned by high frequency induction heating in an oxygen stream. At this time, since carbon is released as carbon dioxide, a carbon content is quantified by detecting carbon dioxide with an infrared detector. As a measuring device, for example, a Model No. CS 844 manufactured by Leco Corporation may be used.

According to the first embodiment, an electrode is provided. The electrode includes an active material-containing layer which contains an active material. The active material includes a plurality of primary particles including a niobium-titanium composite oxide. The average value ($FU_{ave}$) of the roughness shape coefficient (FU) according to Formula (1) below is 0.70 or more in 100 primary particles among the plurality of primary particles. Each of the 100 primary particles has a particle size of 0.2 times to 4 times an average particle size (D50) determined from the particle size distribution chart of the plurality of primary particles obtained by the laser diffraction scattering method.

[Formula 5]

$$FU = \frac{f}{f_c} = \frac{4\pi a}{l^2} \quad (1)$$

In Formula (1), l represents an outer circumference length of a projected cross-section of each of the 100 primary particles, and a represents a cross-sectional area in the projected cross-section of each of the 100 primary particles.

Therefore, according to the electrode of the embodiment, it is possible to realize a secondary battery that can exhibit high energy density, excellent rapid charge/discharge performance, and long life characteristics.

Second Embodiment

According to a second embodiment, there is provided a secondary battery including a negative electrode, a positive electrode, and an electrolyte. As the negative electrode, the secondary battery includes the electrode according to the first embodiment.

The secondary battery may further include a separator provided between the positive electrode and the negative electrode. The negative electrode, the positive electrode, and the separator can constitute an electrode group. The electrolyte may be held in the electrode group. The secondary battery may further include a container member that houses the electrode group and the electrolyte. The secondary battery may further include a negative electrode terminal electrically connected to the negative electrode and a positive electrode terminal electrically connected to the positive electrode.

The secondary battery may be, for example, a lithium ion secondary battery. The secondary battery also includes non-aqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode included in the secondary battery according to the second embodiment is the electrode according to the first embodiment.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x\le1$, $Li_xFe_{1-y}Mn_yPO_4$; $0<x\le1$, $0<y<1$, and $Li_xCoPO_4$; $0<x\le1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\le1$, $0<y<1$, $0<z<1$, $y+z<1$).

Among the above, examples of compounds more preferable as the positive electrode active material include lithium manganese composite oxides having a spinel structure (e.g., $LiMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_yCo_{1-y}O_2$; $0<x\le1$, $0<y<1$), lithium iron phosphates (e.g., $Li_xFePO_4$; $0<x\le1$), and lithium nickel cobalt manganese composite oxides ($Li_xNi_{1-y-z}Co_yMn_zO_2$; $0<x\le1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\le x\le 1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by weight to 98% by weight, and 2% by weight to 20% by weight, respectively.

When the amount of the binder is 2% by weight or more, sufficient electrode strength can be achieved. The binder may serve as an electrical insulator. Thus, when the amount of the binder is 20% by weight or less, the amount of insulator in the electrode is reduced, and thereby the internal resistance can be decreased.

When an electro-conductive agent is added, the positive electrode active material, binder, and electro-conductive agent are preferably blended in proportions of 77% by weight to 95% by weight, 2% by weight to 20% by weight, and 3% by weight to 15% by weight, respectively.

When the amount of the electro-conductive agent is 3% by weight or more, the above-described effects can be expressed. By setting the amount of the electro-conductive agent to 15% by weight or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by weight or more. The amount of transition metal such as iron, copper, nickel, or chromium contained in the aluminum foil or aluminum alloy foil is preferably 1% by weight or less.

The positive electrode current collector may include a portion where a positive electrode active material-containing layer is not formed on a surface of the positive electrode current collector. This portion may serve as a positive electrode tab.

The positive electrode may be produced by the following method, for example. First, an active material, a conductive agent, and a binder are suspended in a solvent to prepare a slurry. The slurry is applied onto one surface or both of reverse surfaces of a current collector. Next, the applied slurry is dried to form a laminate of active material-containing layer and current collector. Then, the laminate is subjected to pressing. The positive electrode can be produced in this manner.

Alternatively, the positive electrode may also be produced by the following method. First, an active material, a conductive agent, and a binder are mixed to obtain a mixture. Next, the mixture is formed into pellets. Then, the positive electrode can be obtained by arranging the pellets on the current collector.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by weight or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 5:
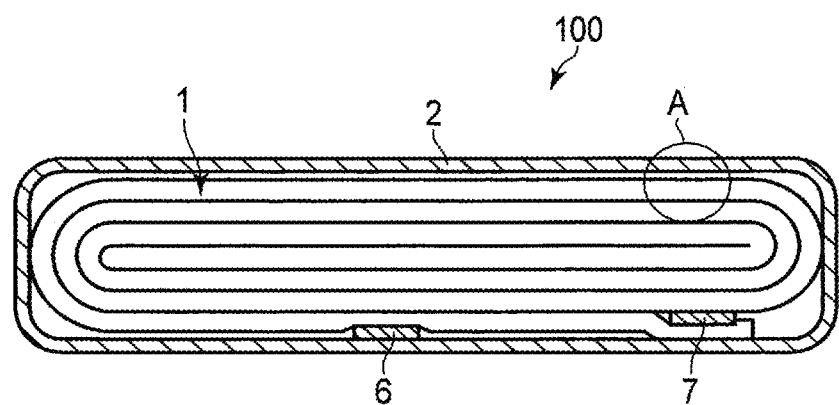
FIG. 5 is a cross-sectional view schematically showing an example of a secondary battery according to the embodiment.
Figure 6:
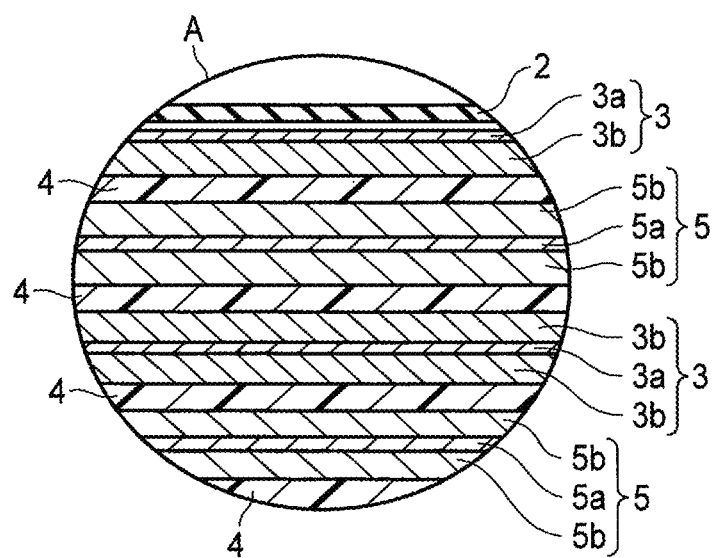
FIG. 6 is an enlarged cross-sectional view of section A of the secondary battery shown in FIG. 5.

FIG. 5 is a cross-sectional view schematically showing an example of a secondary battery according to the second embodiment. FIG. 6 is an enlarged cross-sectional view of section A of the secondary battery shown in FIG. 5.

The secondary battery 100 shown in FIGS. 5 and 6 includes a bag-shaped container member 2 shown in FIGS. 5 and 6, an electrode group 1 shown in FIG. 5, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 5, the electrode group 1 is a wound electrode group in a flat form. The wound electrode group 1 in a flat form includes a negative electrode 3, a separator 4, and a positive electrode 5, as shown in FIG. 6. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 6. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 5, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 7:
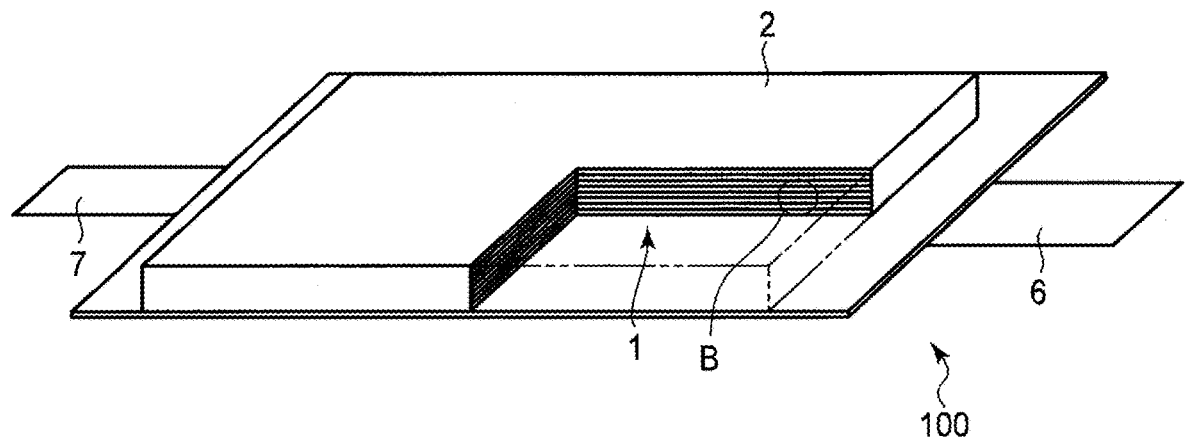
FIG. 7 is a partially cut-out perspective view schematically showing another example of the secondary battery according to the embodiment.
Figure 8:
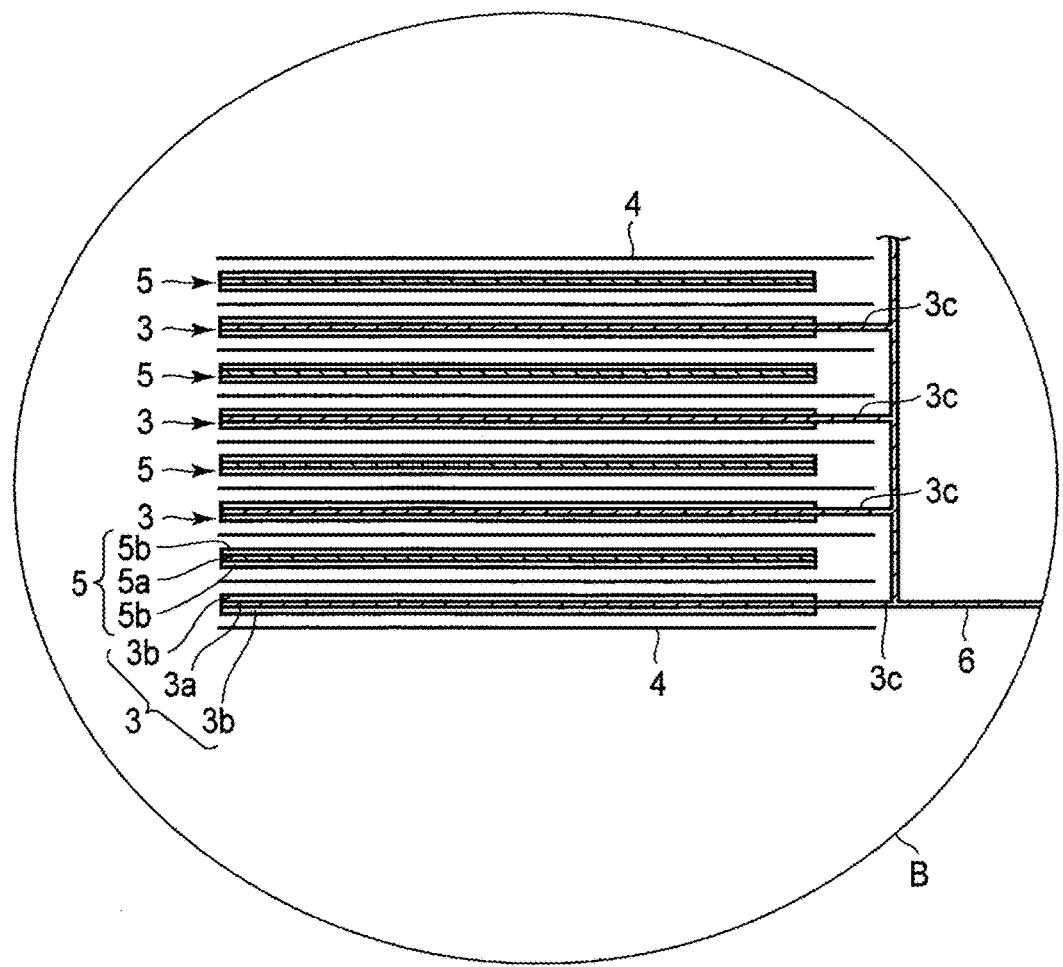
FIG. 8 is an enlarged cross-sectional view of section B of the secondary battery shown in FIG. 7.

The secondary battery according to the second embodiment is not limited to the secondary battery of the structure shown in FIGS. 5 and 6, and may be, for example, a battery of a structure as shown in FIGS. 7 and 8.

FIG. 7 is a partially cut-out perspective view schematically showing another example of a secondary battery according to the second embodiment. FIG. 8 is an enlarged cross-sectional view of section B of the secondary battery shown in FIG. 7.

The secondary battery 100 shown in FIGS. 7 and 8 includes an electrode group 1 shown in FIGS. 7 and 8, a container member 2 shown in FIG. 7, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 8, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 8, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the second embodiment includes the electrode according to the first embodiment as the negative electrode. Therefore, the secondary battery can exhibit high energy density, excellent rapid charge/discharge performance, and long life characteristics.

Third Embodiment

According to a third embodiment, a battery module is provided. The battery module includes plural of the secondary battery according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

Figure 9:
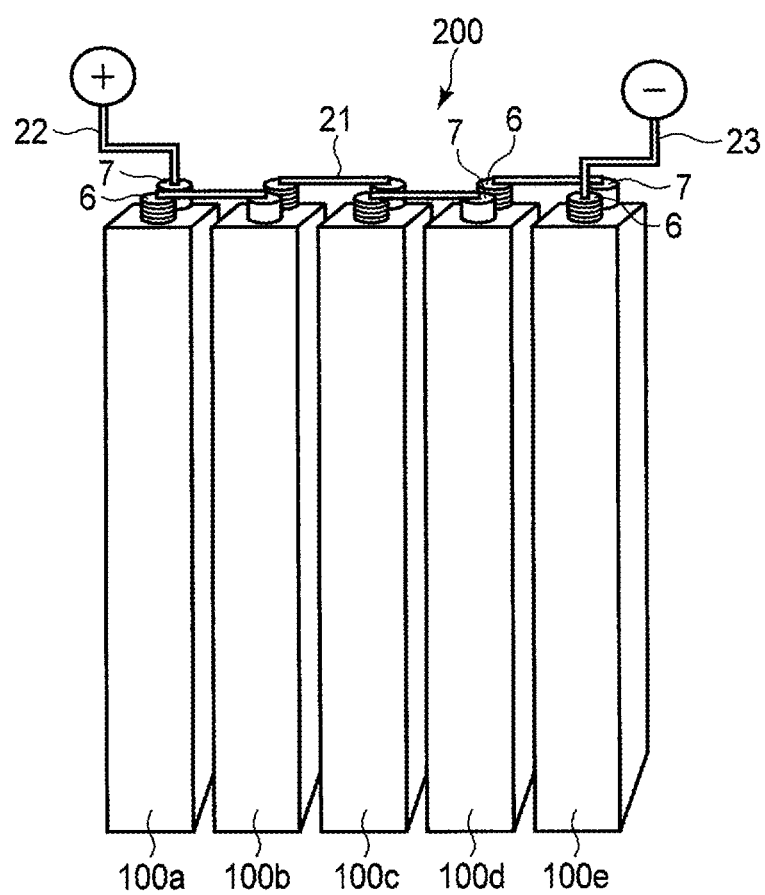
FIG. 9 is a perspective view schematically showing an example of a battery module according to the embodiment.

FIG. 9 is a perspective view schematically showing an example of the battery module according to the third embodiment. A battery module 200 shown in FIG. 9 includes five single-batteries 100a to 100e, four bus bars 21, a positive electrode-side lead 22, and a negative electrode-side lead 23. Each of the five single-batteries 100a to 100e is a secondary battery according to the second embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 9 is a battery module of five in-series connection.

As shown in FIG. 9, the positive electrode terminal 7 of the single-battery 100a located at left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the third embodiment includes the secondary battery according to the second embodiment. Therefore, the battery module can exhibit high energy density, excellent rapid charge/discharge performance, and long life characteristics.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 11:
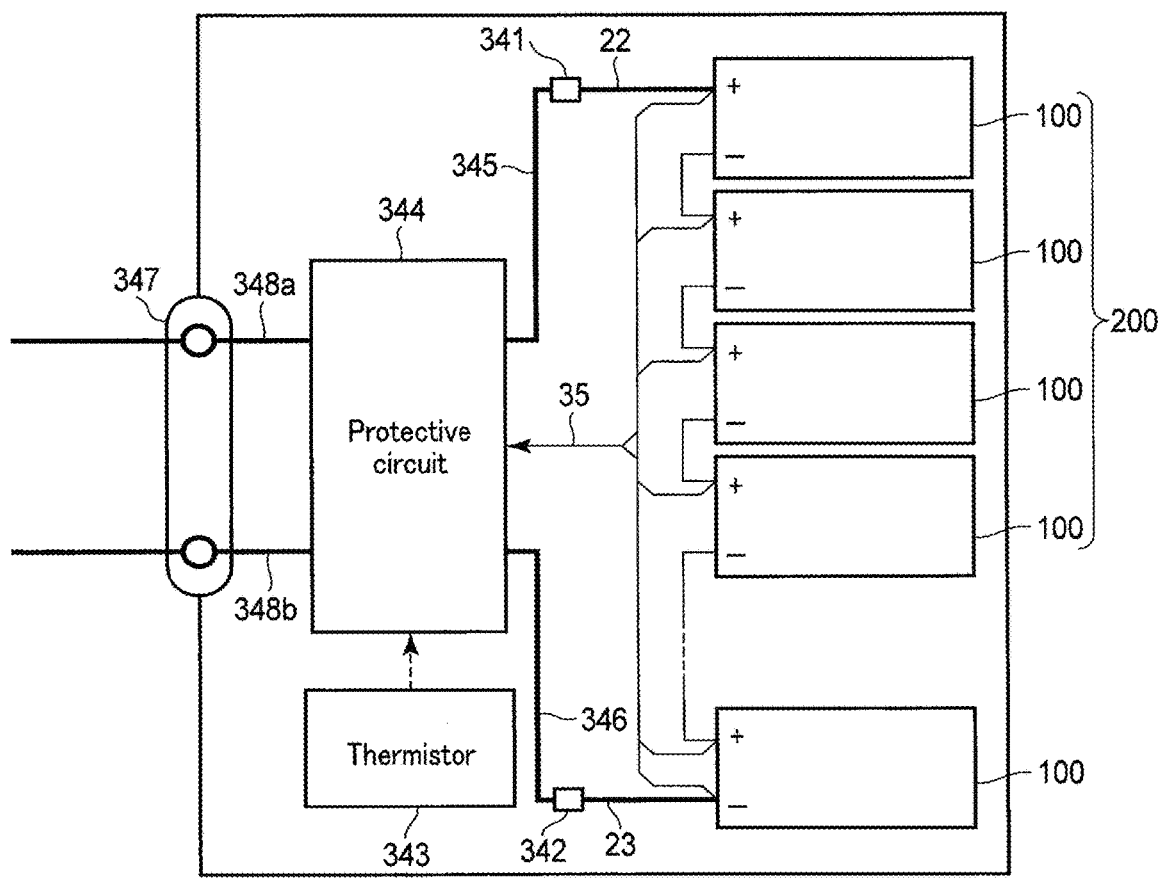
FIG. 11 is a block diagram showing an example of an electric circuit of the battery pack shown in FIG. 10.

FIG. 10 is an exploded perspective view schematically showing an example of the battery pack according to the fourth embodiment. FIG. 11 is a block diagram showing an example of an electric circuit of the battery pack shown in FIG. 10.

A battery pack 300 shown in FIGS. 10 and 11 includes a housing container 31, a lid 32, protective sheets 33, battery module 200, a printed wiring board 34, wires 35, and an insulating plate (not shown).

The housing container 31 shown in FIG. 10 is a square bottomed container having a rectangular bottom surface. The housing container 31 is configured to be capable of storing the protection sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 has a structure shown in FIGS. 5 and 6. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 11. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

A battery pack according to a fourth embodiment includes the secondary battery according to the second embodiment or the battery module according to the third embodiment. Therefore, the battery pack can exhibit high energy density, excellent rapid charge/discharge performance, and long life characteristics.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two-wheeled to four-wheeled hybrid electric automobiles, two-wheeled to four-wheeled electric automobiles, electrically assisted bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

The vehicle according to the fifth embodiment may have plural battery packs installed. In such a case, the battery packs may be electrically connected in series, electrically connected in parallel, or electrically connected in a combination of in-series connection and in-parallel connection.

An example of the vehicle according to the fifth embodiment is explained below, with reference to the drawings.

Figure 12:
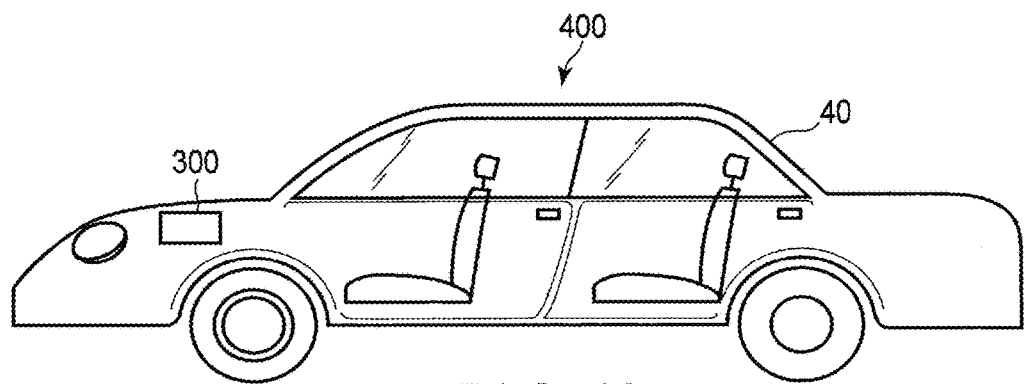
FIG. 12 is a cross-sectional view schematically showing an example of a vehicle according to the embodiment.

FIG. 12 is a cross-sectional view schematically showing an example of a vehicle according to the fifth embodiment.

A vehicle 400, shown in FIG. 12 includes a vehicle body 40 and a battery pack 300 according to the fourth embodiment. In the example shown in FIG. 12, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 12, the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 13, an aspect of operation of the vehicle according to the fifth embodiment is explained.

FIG. 13 is a view schematically showing another example of the vehicle according to the fifth embodiment. A vehicle 400, shown in FIG. 13, is an electric automobile.

The vehicle 400, shown in FIG. 13, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 13, the position of the vehicle power source 41 installed in the vehicle 400 is schematically shown.

The vehicle power source 41 includes plural (for example, three) battery packs 300a, 300b and 300c, battery management unit (BMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 13) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

A vehicle according to a fifth embodiment includes the battery pack according to the fourth embodiment. Therefore, according to the present embodiment, it is possible to provide a vehicle including a battery pack that can exhibit high energy density, excellent rapid charge/discharge performance, and long life characteristics.

EXAMPLES

Hereinafter, the above embodiment will be described in more detail based on examples.

<Synthesis Method>

Example 1

First, commercially available oxide reagents $Nb_2O_5$ and $TiO_2$ were prepared. These powders were weighed so that the molar ratio of Nb/Ti was 1.0. These powders were mixed using a ball mill for 1 hour. The obtained mixture was placed in an electric furnace and subjected to preliminary firing at a temperature of 1000° C. for 12 hours. The preliminary-fired powder was again placed in the ball mill. Powder of $TiO_2$ was added so that the final Nb/Ti molar ratio became 0.5, and the mixture was mixed for 3 hours. The mixture was placed in the electric furnace again and the first main firing was performed at a temperature of 1100° C. for 5 hours. After cooling to room temperature, the mixture was ground in the ball mill for 1 hour and the second main firing was performed at a temperature of 1100° C. for 5 hours. Thereafter, the annealing treatment was performed at a temperature of 500° C. for 2 hours. The powder after the annealing treatment was slightly ground using an agate mortar to release the aggregation of the particles. Thus, an active material powder according to Example 1 was obtained.

For the electrode density measurement and electrochemical measurement to be described later, an electrode was produced by the following procedure using the produced active material powder.

Acetylene black as a conductive agent was mixed at a ratio of 10 parts by weight to 100 parts by weight of the active material powder. The mixture was dispersed in N-methyl-2-pyrrolidone (NMP) to obtain a dispersion solution. 10 parts by weight of polyvinylidene fluoride (PVdF) as a binder was mixed with the obtained dispersion solution based on 100 parts by weight of the active material powder to produce an electrode slurry. The slurry was applied onto a current collector made of an aluminum foil using a blade to obtain a laminate. The laminate was dried at a temperature of 130° C. for 12 hours under vacuum. The dried laminate was compactly pressed at a predetermined press pressure using a roll press device to obtain an electrode having an electrode density of 2.5 g/cm$^3$.

Examples 2 to 9

Active material powders were synthesized in the same manner as described in Example 1 except that the final molar ratio of Nb/Ti was changed as shown in Table 1 by changing the amount of TiO$_2$ or Nb$_2$O$_5$ added after the preliminary firing, and an electrode was produced using this active material powder. That is, Nb$_2$O$_5$ and TiO$_2$, which were commercially available oxide reagents, were prepared, these powders were weighed and mixed so that the molar ratio of Nb/Ti is 1.0, and the mixture is preliminarily fired, and this step is the same procedure as that in Example 1.

However, Examples 5a to 5e were performed by the following procedure.

In Example 5a, active material powders were synthesized in the same manner as described in Example 1 except that the final molar ratio of Nb/Ti was changed to 1.95 by adding Nb$_2$O$_5$ after the preliminary firing when synthesizing the active material powder, and an electrode was produced using this active material powder.

In Examples 5b and 5c, active material powders were produced in the same manner as in Example 5a, and then the press pressure during producing the electrode was made different from that in Example 5a, thereby producing electrodes with electrode densities of 2.35 g/cm$^3$ and 3.1 g/cm$^3$, respectively. In other words, in Examples 1 to 4, 5a, 5d, 5e, and 6 to 9, the electrodes were compactly pressed at a common press pressure (at the same press pressure). In Examples 10 to 20 and Comparative Examples 1 to 6 described later, the electrodes were compactly pressed at the same press pressure.

Example 5d is an example in which an active material powder was produced in the same manner as in Example 5a and then ground by a wet bead mill in order to further reduce the average particle size (D50). The fine particles obtained by grinding by the wet bead mill were removed by centrifugal separation to produce an active material powder according to Example 5d. Thereafter, an electrode was produced in the same manner as in Example 5a using the active material powder.

Example 5e is an example in which an active material powder produced in the same manner as in Example 5a is formed into pellets having a diameter of 10 mm and a thickness of 1 mm by uniaxial pressing, the pellets were fired for 1 hour, and then the fired pellets were roughly ground with a mortar. Thus, the average particle size (D50) was increased. An electrode was produced in the same manner as in Example 5a using the roughly ground active material powder.

Examples 10 to 20

In Examples 10 to 20, with respect to the niobium-titanium composite oxide having a crystal phase of Nb$_2$TiO$_7$ and a composition formula represented by Li$_x$TiNb$_{1.95}$O$_7$ (0≤x≤5), a compound containing at least one dopant M (0.05 mol % in oxide MO$_x$ equivalent) based on the total weight of Li$_x$TiNb$_{1.95}$O$_7$ was synthesized. Here, the dopant M is at least one selected from the group consisting of Na, K, Ca, B, Co, Fe, Mn, Ni, Si, P, and Mo.

In Example 10, when changing the final molar ratio of Nb/Ti to 1.95 by adding Nb$_2$O$_5$ after the preliminary firing, Na$_2$CO$_3$ was further added so that Na was 0.05 mol % based on Ti, and mixed. Thereafter, main firing and annealing were performed in the same manner as in Example 1 to produce a niobium-titanium composite oxide. In Example 10, carbon coating was performed on the surface of the obtained niobium-titanium composite oxide by the following procedure. First, this powder was dispersed in a saturated sucrose solution and dried with a spray dryer. Next, the dried powder was heated in a nitrogen atmosphere at a temperature of 600° C. for 2 hours to carbonize the sucrose, thereby obtaining an active material powder having a surface coated with carbon. Thereafter, an electrode was produced in the same manner as in Example 1 using the active material powder.

In Examples 11 to 20, active material powders were synthesized in the same manner as in Example 10 except that the kind of the dopant M was changed to K, Ca, B, Co, Fe, Mn, Ni, Si, P, and Mo, respectively. K$_2$CO$_3$, CaCO$_3$, B$_2$O$_3$, Co$_2$O$_3$, Fe$_2$O$_3$, Mn$_2$O$_3$, Ni(NO$_3$)$_2$, SiO$_2$, H$_3$PO$_4$, and MoO$_3$ were respectively used as raw materials of the dopant M in Examples 11 to 20. Further, the active material powders produced in Examples 11 to 20 were used to produce the electrodes according to the examples.

Comparative Examples 1 to 4

Commercially available oxide reagents Nb$_2$O$_5$ and TiO$_2$ were prepared. These powders were weighed so that the molar ratio of Nb/Ti was 2.0 as the desired composition. These powders were mixed using a ball mill for 1 hour. The obtained mixture was placed in an electric furnace and fired at a temperature of 1200° C. for 12 hours.

As described above, conventional solid-phase synthesis is performed in such a manner that raw material powders are mixed at the ratio of the desired composition and then synthesized by firing once, whereby the growth of the particles proceeds and the particle size of the primary particles increases, and many clusters are formed by agglomeration of the bonded primary particles. Therefore, in order to achieve high energy density and excellent rapid charge/discharge performance, it is necessary to vigorously grind the clusters using a hammer mill and/or a ball mill in order to obtain a powder having a high proportion of primary particles.

In Comparative Examples 1 to 4, after vigorous grinding using the hammer mill and a roller compactor, the active material powder was ground using a planetary ball mill in order to adjust the average particle size (D50) of the primary particles to 50 μm or less. In Comparative Examples 1 to 4, powders having average particle sizes D50 of 49.8 μm, 10.3 μm, 5 μm, and 1.1 μm were obtained by changing the grinding time by the planetary ball mill.

Thereafter, carbon coating was formed on the surface of the active material powders obtained after grinding by the planetary ball mill in Comparative Examples 1 to 4, in the same manner as described in Example 10. With respect to Comparative Example 4, the active material powder with carbon coating was designated as Comparative Example 4a, and the active material powder without carbon coating was designated as Comparative Example 4b. In this manner, active material powders according to Comparative Examples 1 to 4a and 4b were synthesized, and electrodes were produced in the same manner as in Example 1 using these active material powders.

Comparative Examples 5 and 6

In Comparative Examples 5 and 6, ramsdellite type Li$_2$Ti$_3$O$_7$ was synthesized by the following procedure.

Commercially available oxide reagents $Li_2CO_3$ and $TiO_2$ were mixed so that the molar ratio of Li:Ti was 2:3. This mixture was placed in an electric furnace and fired at a temperature of 800° C. for 6 hours to obtain an active material powder according to Comparative Example 5.

A material that can be synthesized by firing at a low temperature of about 800° C. tends to have a smooth particle surface, because no significant grain growth occurs and the average value $FU_{ave}$ of the roughness shape coefficient (FU) tends to be high.

Further, the active material powder obtained in Comparative Example 5 was formed into pellets having a diameter of 10 mm and a thickness of 1 mm by uniaxial pressing, the pellets were fired for 1 hour, and then the fired pellets were roughly ground with a mortar, thereby obtaining an active material powder according to Comparative Example 6.

<Powder X Ray Diffraction Measurement>

With respect to the active material powders obtained in the respective Examples and Comparative Examples, diffraction patterns were obtained according to the method described in the first embodiment, and the diffraction patterns were analyzed by the Rietveld method. The crystallite size was examined from the obtained diffraction line. Tables 1 to 3 show the crystal phases of the active material powders according to the respective Examples and Comparative Examples as well as their weight ratios and crystallite sizes.

<Measurement of Average Value $FU_{ave}$ of Roughness Shape Coefficient (FU)>

With respect to the active material powders obtained in the respective Examples and Comparative Examples, the average particle size (D50) of primary particles was determined according to the method described in the first embodiment, and further the average value $FU_{ave}$ of the roughness shape coefficient (FU) was determined. The results are shown in Tables 1 to 3.

<Measurement of Electrode Density>

The electrode densities (excluding the current collector) obtained in Examples 1 to 20 and Comparative Examples 1 to 6 were measured. As described above, in all the Examples and all the Comparative. Examples except for Examples 5b and 5c, the electrodes were pressed with a common press pressure (the same press pressure). Tables 1 to 3 show the electrode densities of the respective Examples and Comparative Examples.

Figure 14:
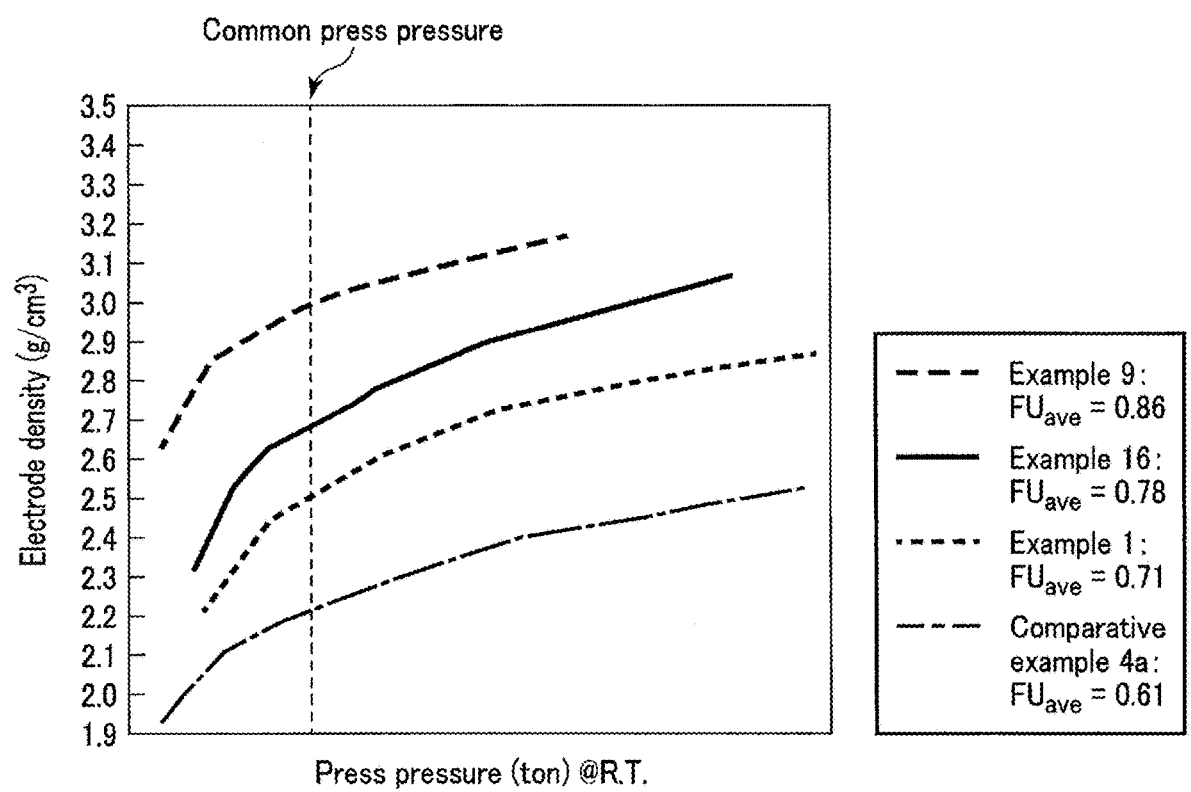
FIG. 14 is a graph showing the superiority and inferiority of consolidation compactibility of electrodes according to Examples and Comparative Examples.

Here, in Examples 1, 9, 16, and Comparative Example 4a, the relationship between the applied pressure and the obtained electrode density was investigated. Thus, it can be confirmed how the consolidation compactibility of the electrode varies according to the average value $FU_{ave}$ of the roughness shape coefficient (FU). The results are shown in the graph of FIG. 14. A horizontal axis in the graph of FIG. 14 shows the pressure applied at room temperature. The press pressure (ton) on the horizontal axis shows that the pressure applied becomes higher as it moves from the left side to the right side of the graph. A vertical axis shows the electrode density ($g/cm^3$). Further, the dotted line orthogonal to the horizontal axis described on the left of the center of the graph indicates the common press pressure.

For Examples 1, 9, 16, and Comparative Example 4a shown in FIG. 14, the average value $FU_{ave}$ of Example 1 was 0.71, the average value $FU_{ave}$ of Example 9 was 0.86, the average value $FU_{ave}$ of Example 16 was 0.78, and the average value $FU_{ave}$ of Comparative Example 4a was 0.61. As is clear from FIG. 14, the higher the average value $FU_{ave}$ is, the higher the electrode density can be made, even if the press pressure is small. In other words, as the average value $FU_{ave}$ is higher, the consolidation compactibility of the electrode becomes excellent. When the average value $FU_{ave}$ is less than 0.70 as in Comparative Example 4a, it is necessary to increase the press pressure excessively to increase the electrode density. Thus, the productivity of the electrode is lowered. Further, when the electrode density is small due to difficulty in increasing the electrode density, the energy density tends to be inferior and also it becomes difficult to form an electron conductive path in the active material-containing layer. Accordingly, the rapid charge/discharge performance and cycle life performance also tend to inferior.

<Electrochemical Measurement>

The electrode produced in the respective Examples and Comparative Examples, a metal lithium foil as a counter electrode, and a nonaqueous electrolyte were used to produce an electrochemical measurement cell. The used nonaqueous electrolyte was obtained by dissolving lithium hexafluorophosphate at a concentration of 1M in a mixed solvent of ethylene carbonate and diethyl carbonate (volume ratio 1:1).

The produced electrochemical measurement cell was charged and discharged in a potential range of 1.0 V to 3.0 V based on a lithium metal electrode. A charge/discharge current value was set to 0.2 C (time discharge rate), and the 0.2 C discharge capacity was confirmed at room temperature. The value of the 0.2 C discharge capacity is an indicator of energy density. Next, charging was performed at 10 C, thereby measuring the time (minutes) required until a capacity corresponding to 80% of the 0.2 C capacity was charged, as an indicator of rapid charge performance. Further, in order to confirm that the negative electrode active materials of the Examples could be stably charged and discharged, 500 cycles of repeated charging and discharging were performed on the cells of the Examples and Comparative Examples (the charging and discharging is defined as one cycle), and the discharge capacity retention ratio after 500 cycles was examined. Charging and discharging were repeated at room temperature with a current value of 1 C (time discharge rate) in a potential range of 1.0 V to 3.0 V based on a lithium metal electrode. In order to confirm the discharge capacity retention ratio after 500 cycles, charging and discharging were performed again at 0.2 C (time discharge rate). Then, the capacity retention ratio (%) when an initial discharge capacity was 100% was calculated by dividing the discharge capacity after 500 cycles by the initial discharge capacity and multiplying by 100. This capacity retention ratio is an indicator of long life characteristics. The above results are summarized in Tables 1 to 3.

TABLE 1

| | Molar ratio ($M_{Nb}/M_{Ti}$) | Crystal phase (% by weight) | Crystallite size (nm) | Average particle size D50 (μm) | Roughness shape coefficient $FU_{ave}$ | Electrode density (g/cm³) | 0.2 C discharge capacity (mAh/g) | 80% rapid charge time (min) | Cycle capacity retention ratio (%) |
|---|---|---|---|---|---|---|---|---|---|
| Example 1 | 0.5 | $Nb_2TiO_7$(75%) + $TiO_2$(25%) | 95 | 2.1 | 0.71 | 2.5 | 180.3 | 7.1 | 85.3 |

TABLE 1-continued

| | Molar ratio ($M_{Nb}/M_{Ti}$) | Crystal phase (% by weight) | Crystallite size (nm) | Average particle size D50 (μm) | Roughness shape coefficient $FU_{ave}$ | Electrode density (g/cm³) | 0.2 C discharge capacity (mAh/g) | 80% rapid charge time (min) | Cycle capacity retention ratio (%) |
|---|---|---|---|---|---|---|---|---|---|
| Example 2 | 0.85 | Nb₂TiO₇(79%) + TiO₂(21%) | 99 | 3.5 | 0.73 | 2.5 | 207.9 | 7 | 89.1 |
| Example 3 | 1.07 | Nb₂TiO₇(82%) + TiO₂(18%) | 101 | 2.8 | 0.78 | 2.6 | 234.8 | 6.3 | 92.2 |
| Example 4 | 1.33 | Nb₂TiO₇(86%) + TiO₂(14%) | 98 | 1.9 | 0.8 | 2.75 | 239 | 6.2 | 94.6 |
| Example 5a | 1.95 | Nb₂TiO₇(100%) | 105 | 1.2 | 0.72 | 2.6 | 264.8 | 6 | 95.8 |
| Example 5b | 1.95 | Nb₂TiO₇(100%) | 105 | 1.2 | 0.72 | 2.35 | 259.1 | 7.2 | 83 |
| Example 5c | 1.95 | Nb₂TiO₇(100%) | 105 | 1.2 | 0.72 | 3.1 | 250.6 | 7.3 | 80.1 |
| Example 5d | 1.95 | Nb₂TiO₇(100%) | 83 | 0.48 | 0.72 | 2.6 | 255.6 | 7.5 | 79.3 |
| Example 5e | 1.95 | Nb₂TiO₇(100%) | 109 | 52.3 | 0.72 | 2.6 | 258.6 | 8.1 | 80.7 |
| Example 6 | 2 | Nb₂TiO₇(100%) | 103 | 1.3 | 0.7 | 2.6 | 263.5 | 6.2 | 93.6 |
| Example 7 | 5 | Nb₁₀Ti₂O₂₉(100%) | 98 | 0.5 | 0.74 | 2.55 | 258.6 | 6.5 | 88.3 |
| Example 8 | 14 | Nb₁₄TiO₃₇(100%) | 93 | 11.2 | 0.79 | 2.73 | 254.6 | 6.8 | 87.8 |
| Example 9 | 24 | Nb₂₄TiO₆₂(100%) | 110 | 25.3 | 0.86 | 3 | 248.4 | 7.1 | 85.2 |

TABLE 2

| | Molar ratio ($M_{Nb}/M_{Ti}$) | Crystal phase (% by weight) | Crystallite size (nm) | Average particle size D50 (μm) | Roughness shape coefficient $FU_{ave}$ | Electrode density (g/cm³) | 0.2 C discharge capacity (mAh/g) | 80% rapid charge time (min) | Cycle capacity retention ratio (%) |
|---|---|---|---|---|---|---|---|---|---|
| Example 10 | 1.95 | Nb₂TiO₇(100%) | 110 | 1.5 | 0.82 | 2.85 | 263.1 | 6.4 | 91.5 |
| Example 11 | 1.95 | Nb₂TiO₇(100%) | 115 | 1.8 | 0.84 | 2.9 | 265.6 | 6 | 93.3 |
| Example 12 | 1.95 | Nb₂TiO₇(100%) | 102 | 1.2 | 0.8 | 2.71 | 260.3 | 6.2 | 92.9 |
| Example 13 | 1.95 | Nb₂TiO₇(100%) | 110 | 1.9 | 0.84 | 2.84 | 261.8 | 6.3 | 93.1 |
| Example 14 | 1.95 | Nb₂TiO₇(100%) | 108 | 1.3 | 0.79 | 2.7 | 257.8 | 6.2 | 92.5 |
| Example 15 | 1.95 | Nb₂TiO₇(100%) | 106 | 1.5 | 0.81 | 2.77 | 263.4 | 6.1 | 93 |
| Example 16 | 1.95 | Nb₂TiO₇(100%) | 101 | 1.2 | 0.78 | 2.69 | 259.2 | 6.1 | 92.8 |
| Example 17 | 1.95 | Nb₂TiO₇(100%) | 104 | 1.2 | 0.79 | 2.7 | 258.8 | 6.2 | 91.4 |
| Example 18 | 1.95 | Nb₂TiO₇(100%) | 105 | 1.4 | 0.8 | 2.73 | 262.2 | 6.3 | 91.8 |
| Example 19 | 1.95 | Nb₂TiO₇(100%) | 106 | 1.6 | 0.85 | 2.93 | 256.9 | 6.1 | 92.6 |
| Example 20 | 1.95 | Nb₂TiO₇(100%) | 110 | 2 | 0.78 | 2.68 | 255.5 | 6.3 | 91.7 |

TABLE 3

| | Molar ratio ($M_{Nb}/M_{Ti}$) | Crystal phase (% by weight) | Crystallite size (nm) | Average particle size D50 (μm) | Roughness shape coefficient $FU_{ave}$ | Electrode density (g/cm³) | 0.2 C discharge capacity (mAh/g) | 80% rapid charge time (min) | Cycle capacity retention ratio (%) |
|---|---|---|---|---|---|---|---|---|---|
| Comparative Example 1 | 2 | Nb₂TiO₇(100%) | 110 | 49.8 | 0.68 | 2.35 | 260.2 | 8.1 | 81.5 |
| Comparative Example 2 | 2 | Nb₂TiO₇(100%) | 98 | 10.3 | 0.65 | 2.3 | 253.3 | 8.3 | 79.5 |
| Comparative Example 3 | 2 | Nb₂TiO₇(100%) | 85 | 5 | 0.63 | 2.28 | 248.7 | 8.5 | 77.5 |
| Comparative Example 4a | 2 | Nb₂TiO₇(100%) | 67 | 1.1 | 0.61 | 2.22 | 239.8 | 9.1 | 68.3 |
| Comparative Example 4b | 2 | Nb₂TiO₇(100%) | 67 | 1.1 | 0.62 | 2.23 | 239.1 | 9.4 | 62.3 |
| Comparative Example 5 | — | Li₂Ti₃O₇(100%) | 40 | 1.2 | 0.78 | 2.35 | 160.1 | 17.8 | 45.3 |
| Comparative Example 6 | — | Li₂Ti₃O₇(100%) | 35 | 1.4 | 0.65 | 2.32 | 159.8 | 18.1 | 45.1 |

As shown in Examples 1 to 20, the electrode with the active material containing a plurality of primary particles containing a niobium-titanium composite oxide, in which the average value $FU_{ave}$ of the roughness shape coefficient (FU) of 100 primary particles extracted under specific conditions was 0.70 or more, exhibited high energy density, excellent rapid charge/discharge performance, and long life characteristics. On the other hand, Comparative Examples 5 and 6 are not niobium-titanium composite oxides but are examples containing only a ramsdellite type lithium titanate as the active material. Comparative Example 5 was inferior to the Examples in energy density, rapid charge performance, and life characteristics, in spite of the fact that the average value $FU_{ave}$ of the roughness shape coefficient (FU) was 0.70 or more (0.78 in this case).

Examples 10 to 20 and Comparative Examples 1 to 4a are examples in which a carbon coating is formed on the particle surface. Examples 10 to 20, in which the average value $FU_{ave}$ of the roughness shape coefficient (FU) was 0.70 or more, exhibited high energy density, excellent rapid charge/ discharge performance, and long life characteristics, as compared with Comparative Examples 1 to 4a in which the average value $FU_{ave}$ was less than 0.70.

Comparison between Example 5a and Examples 5b and 5c shows that, in the case of Example 5a in which the electrode density is in the range of 2.40 g/cm³ to 3.0 g/cm³, it is possible to achieve high energy density, excellent rapid charge/discharge performance, and long life characteristics.

Comparison between Example 5a and Examples 5d and 5e shows that, in the case of Example 5a in which the average particle size (D50) of the primary particles is in the range of 0.50 μm to 5 μm, it is possible to achieve high energy density, excellent rapid charge/discharge performance, and long life characteristics.

For example, as shown in Examples 1 to 4 and 5a, when the ratio of the amount of the niobium-titanium composite oxide to the total amount of the active material is 75% by weight or more, it is possible to achieve high energy density, excellent rapid charge/discharge performance, and long life characteristics. In particular, as shown in Example 5a, when the ratio of the amount of the niobium-titanium composite oxide to the total amount of the active material is 100% by weight, it is possible to achieve high energy density, excellent rapid charge/discharge performance, and long life characteristics.

As shown in Examples 6 to 9, even when the composition of the niobium-titanium composite oxide is changed, as long as the average value $FU_{ave}$ is 0.70 or more, it is possible to achieve high energy density, excellent rapid charge/discharge performance, and long life characteristics.

As shown in Examples 10 to 20, even when the niobium-titanium composite oxide contains the dopant M, it is possible to achieve high energy density, excellent rapid charge/discharge performance, and long life characteristics.

Comparative Examples 5 and 6 are not niobium-titanium composite oxides, but are examples containing only a ramsdellite type lithium titanate as the active material. In Comparative Example 5, the average value $FU_{ave}$ of the roughness shape coefficient (FU) of the active material particles is 0.70 or more (0.78 in this case). In Comparative Example 6, the average value $FU_{ave}$ of the roughness shape coefficient (FU) of the active material particles is less than 0.70 (0.65 in this case). When Comparative Example 5 is compared with Comparative Example 6, Comparative Example 5 shows the same performance as that of Comparative Example 6 in any of energy density, rapid charge performance, and long life characteristics, despite the fact that the average value $FU_{ave}$ is 0.70 or more in Comparative Example 5. This is considered to be due to that the crystallite size of Comparative Example 5 is as small as 40 nm and the crystallinity is low. Even if the average value $FU_{ave}$ is set to 0.70 or more in this manner, when the crystallinity is reduced by grinding, the battery performance is considered to be deteriorated.

According to at least one of the embodiments and examples described above, an electrode is provided. The electrode includes an active material-containing layer which contains an active material. The active material includes a plurality of primary particles including a niobium-titanium composite oxide. The average value ($FU_{ave}$) of the roughness shape coefficient (FU) according to Formula (1) below is 0.70 or more in 100 primary particles among the plurality of primary particles. Each of the 100 primary particles has a particle size of 0.2 times to 4 times an average particle size (D50) determined from the particle size distribution chart of the plurality of primary particles obtained by the laser diffraction scattering method.

[Formula 6]

$$FU = \frac{f}{f_c} = \frac{4\pi a}{l^2} \quad (1)$$

In Formula (1), l represents an outer circumference length of a projected cross-section of each of the 100 primary particles, and a represents a cross-sectional area in the projected cross-section of each of the 100 primary particles.

In the electrode, the primary particles of the active material are likely to closely contact with each other. In addition, the expansion and shrinkage of the active material-containing layer can be suppressed. Therefore, according to the electrode, it is possible to realize a secondary battery that can exhibit high energy density, excellent rapid charge/discharge performance, and long life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electrode comprising
an active material-containing layer which comprises an active material, wherein
the active material comprises a plurality of primary particles comprising a niobium-titanium composite oxide,
the niobium-titanium composite oxide is a compound represented by a first general formula or a second general formula,
the first general formula is $Li_xTi_{1-y}M1_yNb_{2-z}M2_zO_{7+\delta}$, where M1 is at least one selected from the group consisting of Zr, Si, and Sn, M2 is at least one selected from the group consisting of V, Ta, Bi, K, Ca, B, Co, Fe, Mn, Ni, Si, P, and Mo,
the second general formula is $Ti_{1-y}M3_{y+z}Nb_{2-z}O_{7-\delta}$, where M3 is at least one selected from Mg, Fe, Ni, Co, W, Ta, and Mo,
where x satisfies 0≤x≤5, y satisfies 0≤y<1, z satisfies 0≤z<2, and δ satisfies −0.3≤δ≤0.3,
an average value ($FU_{ave}$) of a roughness shape coefficient (FU) according to Formula (1) below is 0.70 or more in 100 primary particles among the plurality of primary particles, and
each of the 100 primary particles has a particle size of 0.2 times to 4 times an average particle size (D50) determined from a particle size distribution chart of the plurality of primary particles obtained by a laser diffraction scattering method,

[Formula 1]

$$FU = \frac{f}{f_c} = \frac{4\pi a}{l^2} \quad (1)$$

where l represents an outer circumference length of a projected cross-section of each of the 100 primary particles, and a represents a cross-sectional area in the projected cross-section of each of the 100 primary particles.

2. The electrode according to claim 1, wherein the average particle size (D50) is within a range of 0.50 μm to 5 μm.

3. The electrode according to claim 1, wherein a content of the niobium-titanium composite oxide of the active material is within a range of 75% by weight to 100% by weight.

4. The electrode according to claim 1, wherein an electrode density is within a range of 2.4 g/cm$^3$ to 3.0 g/cm$^3$.

5. A secondary battery comprising:
a positive electrode;
a negative electrode; and
an electrolyte, wherein
the negative electrode is the electrode according to claim 1.

6. A battery pack comprising the secondary battery according to claim 5.

7. The battery pack according to claim 6, further comprising:
an external power distribution terminal; and
a protective circuit.

8. The battery pack according to claim 6, comprising plural of the secondary battery, wherein the secondary batteries are electrically connected in series, in parallel, or in a combination of in series and in parallel.

9. A vehicle comprising the battery pack according to claim 6.

10. The vehicle according to claim 9, which comprises a mechanism configured to convert kinetic energy of the vehicle into regenerative energy.

11. The electrode according to claim 1, wherein the niobium-titanium composite oxide comprises at least one selected from the group consisting of $Nb_2TiO_7$, $Nb_2Ti_2O_9$, $Nb_{10}Ti_2O_{29}$, $Nb_{14}TiO_{37}$, and $Nb_{24}TiO_{62}$.

12. The electrode according to claim 1, wherein a crystallite size of the active material is in a range of 50 nm to 200 nm.

13. A negative electrode that is the electrode according to claim 1.

* * * * *